(12) United States Patent
Geng et al.

(10) Patent No.: US 12,200,619 B2
(45) Date of Patent: *Jan. 14, 2025

(54) COMMUNICATION METHOD AND APPARATUS

(71) Applicant: Huawei Technologies Co., Ltd., Shenzhen (CN)

(72) Inventors: Tingting Geng, Shanghai (CN); Hongping Zhang, Shenzhen (CN); Jun Chen, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,261

(22) Filed: Nov. 2, 2021

(65) Prior Publication Data
US 2022/0060980 A1 Feb. 24, 2022

Related U.S. Application Data

(63) Continuation of application No. 16/712,446, filed on Dec. 12, 2019, now Pat. No. 11,178,605, which is a (Continued)

(30) Foreign Application Priority Data

Jun. 16, 2017 (CN) .......................... 201710459436.0

(51) Int. Cl.
*H04W 48/20* (2009.01)
*H04W 36/00* (2009.01)
(Continued)

(52) U.S. Cl.
CPC ....... *H04W 48/20* (2013.01); *H04W 36/0027* (2013.01); *H04W 68/005* (2013.01);
(Continued)

(58) Field of Classification Search
CPC ..... H04W 24/02; H04W 24/04; H04W 36/08; H04W 48/20; H04W 52/0209;
(Continued)

(56) References Cited

U.S. PATENT DOCUMENTS

| 6,751,472 B1 * | 6/2004 | Muhonen | H04W 88/02 370/465 |
| 6,992,993 B1 * | 1/2006 | Park | H04W 48/18 370/328 |

(Continued)

FOREIGN PATENT DOCUMENTS

| CN | 102118721 A | 7/2011 |
| CN | 103281780 A | 9/2013 |

(Continued)

OTHER PUBLICATIONS

3GPP TS 38.304 V0.0.2 (May 2017), 3rd Generation Partnership Project; Technical Specification Group Radio Access Network; New Generation Radio Access Network; User Equipment (UE) procedures in Idle mode (Release 15), 13 pages.

(Continued)

*Primary Examiner* — Jean A Gelin
(74) *Attorney, Agent, or Firm* — Slater Matsil, LLP

(57) ABSTRACT

This application provides a communication method and apparatus. The communication method includes: detecting that a terminal in an inactive state is in an out-of-service state, and determining a target cell of the terminal.

19 Claims, 12 Drawing Sheets

Related U.S. Application Data continuation of application No. PCT/CN2018/090882, filed on Jun. 12, 2018.

(51) Int. Cl.
*H04W 68/00* (2009.01)
*H04W 76/19* (2018.01)
*H04W 76/27* (2018.01)
*H04W 76/30* (2018.01)

(52) U.S. Cl.
CPC ........... *H04W 76/19* (2018.02); *H04W 76/27* (2018.02); *H04W 76/30* (2018.02)

(58) Field of Classification Search
CPC ........... H04W 52/0251; H04W 68/005; H04W 76/10; H04W 76/19; H04W 76/20; H04W 76/25; H04W 76/27; H04W 76/28; H04W 76/30; H04W 76/34; H04W 76/38; Y02D 10/00; Y02D 30/50; Y02D 30/70
USPC ......................................................... 370/329
See application file for complete search history.

(56) References Cited

U.S. PATENT DOCUMENTS

| | | | |
|---|---|---|---|
| 7,570,609 B2 | 8/2009 | Patterson et al. | |
| 2004/0156350 A1* | 8/2004 | Brasic ................... | H04W 74/06 370/449 |
| 2006/0111098 A1* | 5/2006 | Abdel-Kader ...... | H04L 65/1101 455/421 |
| 2008/0194287 A1 | 8/2008 | Narang et al. | |
| 2009/0271517 A1* | 10/2009 | Naylor ................... | H04L 69/28 709/227 |
| 2010/0330993 A1 | 12/2010 | Kone | |
| 2011/0199905 A1* | 8/2011 | Pinheiro ................. | H04W 4/50 370/235 |
| 2011/0207465 A1* | 8/2011 | Dwyer ................... | H04W 72/02 455/450 |
| 2011/0244911 A1* | 10/2011 | Kodama ................. | H04W 4/20 455/517 |
| 2012/0115481 A1* | 5/2012 | Kim ....................... | H04W 48/02 455/436 |
| 2012/0225650 A1* | 9/2012 | Son ....................... | H04W 36/30 455/434 |
| 2012/0231760 A1 | 9/2012 | Zhu et al. | |
| 2012/0264425 A1 | 10/2012 | Krishnamoorthy et al. | |
| 2012/0315930 A1 | 12/2012 | Ai | |
| 2013/0010641 A1 | 1/2013 | Dinan | |
| 2013/0029718 A1 | 1/2013 | Saito | |
| 2013/0203420 A1* | 8/2013 | Hapsari ................. | H04W 24/10 455/437 |
| 2013/0315086 A1 | 11/2013 | Hancock et al. | |
| 2014/0064134 A1 | 3/2014 | Huang et al. | |
| 2014/0194086 A1* | 7/2014 | Alam ................ | H04W 52/0254 455/574 |
| 2014/0199983 A1 | 7/2014 | Bergstrom et al. | |
| 2014/0295827 A1 | 10/2014 | Tesanovic et al. | |
| 2015/0003227 A1* | 1/2015 | Splitz ................... | H04W 56/001 370/216 |
| 2015/0004970 A1 | 1/2015 | Venkatachari et al. | |
| 2015/0055573 A1 | 2/2015 | Miklos et al. | |
| 2015/0181614 A1* | 6/2015 | Mitra ..................... | H04W 68/00 370/329 |
| 2015/0201392 A1 | 7/2015 | Sartori et al. | |
| 2015/0271856 A1* | 9/2015 | Tong ..................... | H04W 76/14 455/552.1 |
| 2015/0327167 A1 | 11/2015 | Ljung | |
| 2015/0327240 A1 | 11/2015 | Yamada et al. | |
| 2015/0327248 A1* | 11/2015 | Griot ................... | H04W 72/542 370/252 |
| 2015/0382182 A1 | 12/2015 | Lim et al. | |
| 2016/0066255 A1* | 3/2016 | Marinier ............. | H04W 56/001 370/350 |
| 2016/0088468 A1* | 3/2016 | Sharma ................ | H04M 15/93 370/329 |
| 2016/0095020 A1* | 3/2016 | Balakrishnan .... | H04W 36/0022 370/331 |
| 2016/0095144 A1 | 3/2016 | Lindoff et al. | |
| 2016/0205650 A1 | 7/2016 | Devarayanigari et al. | |
| 2016/0212721 A1* | 7/2016 | Sheng ................... | H04W 76/14 |
| 2016/0309379 A1* | 10/2016 | Pelletier ................ | H04W 76/15 |
| 2017/0163470 A1* | 6/2017 | Seo ......................... | H04W 4/70 |
| 2017/0171690 A1 | 6/2017 | Kim et al. | |
| 2018/0006770 A1 | 1/2018 | Guo et al. | |
| 2018/0063880 A1* | 3/2018 | Bhardwaj ............. | H04W 76/19 |
| 2018/0077673 A1 | 3/2018 | Roy et al. | |
| 2018/0115911 A1 | 4/2018 | Huang et al. | |
| 2018/0199390 A1* | 7/2018 | Hahn .................... | H04W 76/27 |
| 2018/0234894 A1 | 8/2018 | Jiang | |
| 2018/0324656 A1* | 11/2018 | Chen ..................... | H04W 48/02 |
| 2019/0082490 A1 | 3/2019 | Zhang et al. | |
| 2019/0174406 A1* | 6/2019 | Hwang ................. | H04B 17/318 |
| 2019/0268813 A1 | 8/2019 | Ramachandra et al. | |
| 2019/0364492 A1 | 11/2019 | Azizi et al. | |
| 2020/0037210 A1 | 1/2020 | Rugeland et al. | |
| 2020/0077253 A1* | 3/2020 | Kim ..................... | H04W 76/30 |
| 2020/0174048 A1 | 6/2020 | Reader et al. | |
| 2020/0187069 A1* | 6/2020 | Hong ................ | H04W 36/0085 |
| 2020/0305054 A1 | 9/2020 | Zee et al. | |
| 2020/0305094 A1* | 9/2020 | Ouchi .................. | H04L 25/0226 |
| 2020/0305097 A1 | 9/2020 | Bergquist | |
| 2020/0359191 A1 | 11/2020 | Rugeland et al. | |
| 2021/0044956 A1 | 2/2021 | Kim | |
| 2022/0007449 A1* | 1/2022 | You ....................... | H04W 76/19 |
| 2023/0134552 A1* | 5/2023 | Kim ..................... | H04W 60/04 370/329 |

FOREIGN PATENT DOCUMENTS

| | | |
|---|---|---|
| CN | 105898894 A | 8/2016 |
| CN | 106658758 A | 5/2017 |
| CN | 106793169 A | 5/2017 |

OTHER PUBLICATIONS

3GPP TS 38.331 V0.0.3 (May 2017), 3rd Generation Partnership Project; Technical Specification Group Radio Access Network; NR; Radio Resource Control (RRC); Protocol specification(Release 15), 20 pages.

Da Silva, I.L. et al., "A novel state model for 5G Radio Access Networks," IEEE ICC2016-Workshops: WO9-Workshop on 5G RAN Design, May 23, 2016, 6 pages.

Samsung, "PLMN Selection in RRC INACTIVE state", 3GPP TSG-RAN WG2 NR Ad-hoc #2 R2-1706829, Qingdao, China, Jun. 27-29, 2017, 4 pages.

Xiaomi, "Consideration on the transition between inactive state and idle state", 3GPP TSG-RAN WG2 #97, R2-1701001, Athens, Greece, Feb. 13-17, 2017, 3 pages.

* cited by examiner

COMMUNICATION METHOD AND APPARATUS

CROSS-REFERENCE TO RELATED APPLICATIONS

This application is a continuation of U.S. patent application Ser. No. 16/712,446, filed on Dec. 12, 2019, which is a continuation of International Application No. PCT/CN2018/090882, filed on Jun. 12, 2018, which claims priority to Chinese Patent Application No. 201710459436.0, filed on Jun. 16, 2017. All of the afore-mentioned patent applications are hereby incorporated by reference in their entireties.

TECHNICAL FIELD

This application relates to the field of communication technologies, and in particular, to a communication method and apparatus.

BACKGROUND

To satisfy an increasing traffic requirement and deal with services with various requirements, the 3rd Generation Partnership Project (3GPP) standardization organization is currently formulating a next generation communications system. In a current discussion, a new radio resource control (RRC) state, that is, an inactive state, is introduced. User equipment (UE) in the inactive state disconnects an RRC connection to a network, and downlink data does not need to be monitored continuously, thereby achieving a power saving effect the same as an idle state. However, context information of the UE is saved by both the UE in the inactive state and an access network device. When the UE needs to enter a connected state (for example, the UE needs to send uplink data or the network pages the UE for entering the connected state), the access network device may configure the UE in the inactive state to enter the connected state based on the saved context information, thereby reducing a latency and signaling overheads.

However, for the UE in the inactive state, a relatively large quantity of procedures need to be optimized or specified.

SUMMARY

This application provides a communication method, to provide a solution applicable to a network environment in which a terminal in an inactive state exists.

According to a first aspect, this application provides a communication method including: detecting that a terminal in an inactive state is in an out-of-service state; and determining a target cell of the terminal, where the determining a target cell of the terminal includes: determining the target cell of the terminal entering an idle state if the target cell is not determined within a first length of time, where the terminal enters the idle state after the first length of time expires; or the determining a target cell of the terminal includes determining the target cell of the terminal within the first length of time.

In this way, after it is detected that the terminal in the inactive state is in the out-of-service state, the target cell of the terminal is determined, so that the terminal can return a network again, facilitating subsequently normally paging or finding the terminal. Further, when the target cell is not determined within the first length of time, the terminal enters the idle state, and context information of the terminal does not need to be stored any more, so that storage space can be saved.

In a possible design, the method further includes: sending first indication information to an access network device corresponding to the target cell, where the first indication information is used to indicate that the terminal is in the out-of-service state before accessing the target cell.

In this way, when returning the network again, the terminal may report, to the access network device corresponding to the target cell, that the terminal is in the out-of-service state before accessing the target cell. To be specific, the access network device is notified of a reason which the terminal accesses the network.

In a possible design, the sending first indication information to an access network device corresponding to the target cell includes: sending a radio resource control RRC connection setup request message to the access network device corresponding to the target cell of the terminal entering the idle state, where the RRC connection setup request message includes the first indication information.

In a possible design, the sending first indication information to an access network device corresponding to the target cell includes: sending an RRC connection resume request message to the access network device corresponding to the target cell of the terminal having the target cell determined within the first length of time, where the RRC connection resume request message includes the first indication information.

In a possible design, after the detecting that a terminal in an inactive state is in an out-of-service state, the method further includes: starting a timer, where a length of time of the timer is the first length of time.

The timer may be configured to determine whether the terminal needs to continue to reserve the inactive state or be configured to control a timing of entering the idle state by the terminal.

According to a second aspect, this application provides a communication method including: receiving first indication information, where the first indication information is used to indicate that a terminal is in the out-of-service state before accessing a target cell; and determining, according to the first indication information, that the terminal is in the out-of-service state before accessing the target cell.

In this way, an access network device can learn, according to the first indication information in time, that the terminal is in the out-of-service state before accessing the target cell, and the access network device may learn of a reason why the terminal accesses a network.

In a possible design, the receiving first indication information includes: receiving an RRC connection setup request message from the terminal, where the RRC connection setup request message includes the first indication information.

In a possible design, after the determining, according to the first indication information, that the terminal is in the out-of-service state before accessing the target cell, the method further includes: if determining that context information of the terminal exists, deleting the context information of the terminal, and releasing a network connection that corresponds to the terminal and that is between a core network and an access network.

In this way, that the terminal is determined, according to the first indication information, to be in the out-of-service state before accessing the target cell indicates that the previously stored context information of the terminal may have been invalid. In this case, the context information of the terminal is deleted, so that storage resources can be effectively saved. In addition, that the terminal is determined, according to the first indication information, to be in the out-of-service state before accessing the target cell indicates that the network connection that corresponds to the terminal and that is between the core network and the access network may have been unavailable. In this case, the network connection that corresponds to the terminal and that is between the access network and the core network is deleted, so that network resources can be effectively saved.

In a possible design, the receiving first indication information includes: receiving an RRC connection resume request message from the terminal, where the RRC connection resume request message includes the first indication information.

In a possible design, after the determining, according to the first indication information, that the terminal is in the out-of-service state before accessing the target cell, the method further includes: reserving an inactive state of the terminal if determining that context information of the terminal exists.

In a possible design, after the determining, according to the first indication information, that the terminal is in the out-of-service state before accessing the target cell, the method further includes: configuring the terminal to be in the inactive state, a connected state, or an idle state if determining that the context information of the terminal does not exist.

In this application, if it is determined that the context information of the terminal does not exist, the access network device may configure, based on information, such as a service type and a service volume, of the terminal, the terminal to enter the inactive state, the connected state, or the idle state, thereby better selecting a state suitable for the terminal, avoiding an unnecessary state conversion process, and reducing signaling overheads in a state conversion process.

According to a third aspect, this application provides a communications apparatus, where the communications apparatus may be a terminal or a chip inside a terminal, and the communications apparatus has a function for implementing the method example in the first aspect. The function may be implemented by hardware or by hardware executing corresponding software. The hardware or the software includes one or more modules corresponding to the foregoing function.

In a possible design, a structure of the communications apparatus includes a detection module and a processing module, where the modules may perform the corresponding functions in the foregoing method example. Specifically: the detection module is configured to detect that a terminal in an inactive state is in an out-of-service state; and the processing module is configured to determine a target cell of the terminal, where the processing module is specifically configured to: determine the target cell of the terminal entering an idle state if the target cell is not determined within a first length of time, where the terminal enters the idle state after the first length of time expires; or determine the target cell of the terminal within the first length of time.

In a possible design, the communications apparatus further includes a sending module.

The sending module is configured to send first indication information to an access network device corresponding to the target cell, where the first indication information is used to indicate that the terminal is in the out-of-service state before accessing the target cell.

In a possible design, the sending module is specifically configured to send a radio resource control RRC connection setup request message to the access network device corresponding to the target cell of the terminal entering the idle state, where the RRC connection setup request message includes the first indication information.

In a possible design, the sending module is specifically configured to send an RRC connection resume request message to the access network device corresponding to the target cell of the terminal having the target cell determined within the first length of time, where the RRC connection resume request message includes the first indication information.

In a possible design, the processing module is further configured to: start a timer, where a length of time of the timer is the first length of time.

According to a fourth aspect, this application provides a communications apparatus, where the communications apparatus may be an access network device or a chip inside an access network device, and the communications apparatus has a function for implementing the method example in the second aspect. The function may be implemented by hardware or by hardware executing corresponding software. The hardware or the software includes one or more modules corresponding to the foregoing function.

In a possible design, a structure of the communications apparatus includes a receiving module and a processing module, where the modules may perform the corresponding functions in the foregoing method example. Specifically: the receiving module is configured to receive first indication information, where the first indication information is used to indicate that a terminal is in the out-of-service state before accessing the target cell; and the processing module is configured to determine, according to the first indication information, that the terminal is in the out-of-service state before accessing the target cell.

In a possible design, the receiving module is specifically configured to: receive an RRC connection setup request message from the terminal, where the RRC connection setup request message includes the first indication information.

In a possible design, after determining, according to the first indication information, that the terminal is in the out-of-service state before accessing the target cell, the processing module is further configured to: if determining that context information of the terminal exists, delete the context information of the terminal, and release a network connection that corresponds to the terminal and that is between a core network and an access network.

In a possible design, the receiving module is specifically configured to: receive an RRC connection resume request message from the terminal, where the RRC connection resume request message includes the first indication information.

In a possible design, after determining, according to the first indication information, that the terminal is in the out-of-service state before accessing the target cell, the processing module is further configured to: reserve the inactive state of the terminal if determining that the context information of the terminal exists.

In a possible design, after determining, according to the first indication information, that the terminal is in the out-of-service state before accessing the target cell, the processing module is further configured to: configure the terminal to be in the inactive state, a connected state, or an idle state if determining that the context information of the terminal does not exist.

According to a fifth aspect, this application provides a communications apparatus, where the communications apparatus may be a terminal or a chip inside a terminal, and the communications apparatus has a function for implementing the method example in the first aspect. The communications apparatus includes a communications module and a processor.

The communications module is configured to perform communication interaction with another device, where the communications module may be an RF circuit, a WiFi module, a communications interface, a Bluetooth module, and the like.

The processor is configured to implement the functions of the processing module in the third aspect, including: detecting that a terminal in an inactive state is in an out-of-service state; and determining a target cell of the terminal, where the determining a target cell of the terminal includes: determining the target cell of the terminal entering an idle state if the target cell is not determined within a first length of time, where the terminal enters the idle state after the first length of time expires; or the determining a target cell of the terminal includes determining the target cell of the terminal within the first length of time.

Optionally, the communications apparatus may further include a memory, configured to store a program and the like. Specifically, the program may include program code, where the program code includes an instruction. The memory may include an RAM and may further include a nonvolatile memory such as at least one magnetic disk storage. The processor executes an application program stored in the memory, to implement the foregoing functions.

In a possible manner, the communications module, the processor, and the memory may be connected to each other through a bus. The bus may be a peripheral component interconnect standard (PCI) bus, an extended industry standard architecture (EISA) bus, or the like. The bus may be classified into an address bus, a data bus, a control bus, and the like.

According to a sixth aspect, this application provides a communications apparatus, where the communications apparatus may be an access network device or a chip inside an access network device, and the communications apparatus has a function for implementing the method example in the second aspect. The communications apparatus includes a communications module.

The communications module is configured to perform communication interaction with another device, where the communications module may be an RF circuit, a WiFi module, a communications interface, a Bluetooth module, and the like.

The processor is configured to implement the functions of the processing module in the fourth aspect, including: receiving first indication information, where the first indication information is used to indicate that a terminal is in the out-of-service state before accessing the target cell; and determining, according to the first indication information, that the terminal is in the out-of-service state before accessing the target cell.

Optionally, the communications apparatus may further include the memory, configured to store a program and the like. Specifically, the program may include program code, where the program code includes an instruction. The memory may include an RAM and may further include a nonvolatile memory such as at least one magnetic disk storage. The processor executes an application program stored in the memory, to implement the foregoing functions.

In a possible manner, the communications module, the processor, and the memory may be connected to each other through the bus. The bus may be a peripheral component interconnect standard (PCI) bus, an extended industry standard architecture (EISA) bus, or the like. The bus may be classified into an address bus, a data bus, a control bus, and the like.

According to a seventh aspect, this application provides a cell reselection method, including: receiving information about a radio network area configured by an access network device for a terminal, where the radio network area includes one or more cells, and the information about the radio network area includes information used to identify the one or more cells; and performing cell reselection based on the information about the radio network area.

In this way, when the terminal moves inside the radio network area, the cell reselection may be performed based on the information about the radio network area sent by the access network device, so that a cell in the radio network area can be selected as preferentially as possible, thereby effectively preventing a problem of a relatively large quantity of signaling overheads and a relatively long latency from being caused by preferentially reselecting a cell outside the radio network area.

In this application, the information about the radio network area may further include first priority information, where the first priority information includes priority information of one or more cells/frequencies included in the radio network area.

In this application, the terminal may further receive second priority information sent by the access network device by using a system broadcast message or dedicated signaling.

Based on the foregoing content, in a possible implementation, when the terminal performs the cell reselection, the second priority information may be ignored first, and the cell reselection is performed based on the information about the radio network area, or the cell reselection may be performed by comprehensively considering the information about the radio network area and the second priority information. Based on this, this application may have a plurality of possible designs, and detailed description is provided below.

In a possible design, the performing cell reselection based on the information about the radio network area includes: performing the cell reselection based on signal quality of the one or more cells in the radio network area.

In this way, after obtaining the signal quality of the one or more cells in the radio network area, the terminal may perform the cell reselection inside the radio network area based on the signal quality, so that a cell inside the radio network area can be preferentially reselected.

For example, a cell whose signal quality satisfies a requirement (the signal quality is greater than a preset signal quality threshold) is selected from the one or more cells based on the signal quality, to further determine a cell having best signal quality in the cells whose signal quality satisfies the requirement, and reselect the cell. Alternatively, if the information about the radio network area further includes a redistribution parameter of the one or more cells, after a cell whose signal quality satisfies the requirement is selected based on the signal quality, the cell reselection may be performed based on the redistribution parameter.

In a possible design, the information about the radio network area further includes first priority information, where the first priority information includes priority information of the one or more cells included in the radio network area.

The performing cell reselection based on the information about the radio network area includes: performing the cell reselection based on the first priority information.

In this way, the terminal may select, based on the priority information of the one or more cells, a cell having a highest priority, and determine whether the cell having the highest priority is suitable for accessing. If there is only one cell having the highest priority and suitable for accessing, the cell may be reselected by the terminal.

If there are two or more cells having the highest priority, a cell having best signal quality is selected, based on the signal quality, from the cells having the highest priority, and the cell is reselected; or if the first priority information further includes the redistribution parameter of the one or more cells configured by the access network device for the terminal, the terminal may determine, based on the signal quality and the redistribution parameter of the one or more cells in the radio network area, a cell satisfying a condition from the cells having the highest priority, and reselect the cell.

If the terminal cannot select a suitable cell from the cells having the highest priority by using the foregoing methods, the terminal may exclude the cell having the highest priority, select a cell having the highest priority from the remaining cells in the radio network area, and perform cell reselection based on the signal quality (and the redistribution parameter). If the suitable cell is selected, the cell is reselected. If no suitable cell can be selected, the foregoing methods are performed by analogy until a suitable cell is selected.

In a possible design, the method further includes: receiving second priority information, where the second priority information includes priority information of at least one cell.

The performing cell reselection based on the information about the radio network area includes: performing cell reselection based on the information about the radio network area and the second priority information.

In this way, the terminal obtains, based on the second priority information, priority information of a cell in the radio network area (in this case, the priority information of all the cells in the radio network area or the priority information of only some cells in the radio network area may be obtained), selects the cell having the highest priority, and determines whether the cell having the highest priority is suitable for accessing. If there is only one cell that has the highest priority and that is suitable for accessing, the cell may be reselected by the terminal.

If there are two or more cells having the highest priority, the cell having the best signal quality is selected, based on the signal quality, from the cells having the highest priority, and the cell is reselected; or if the second priority information further includes the redistribution parameter of the at least one cell, the terminal may obtain the redistribution parameter of the cell inside the radio network area based on the second priority information, to further determine, based on the signal quality and the redistribution parameter of the cell in the radio network area, the cell satisfying a condition from the cells having the highest priority, and reselect the cell.

In a possible design, second priority information is received, where the second priority information includes priority information of at least one cell.

The performing cell reselection based on the information about the radio network area includes: performing cell reselection based on the first priority information and the second priority information.

In this way, the priority information of the cell in the radio network area may be determined by comprehensively considering the first priority information and the second priority information. Further, if the redistribution parameter of the cell is included in both the first priority information and the second priority information, after the priority information of the cell in the radio network area is determined, the redistribution parameter of the cell can further be obtained. If the priority information of the cell included in the first priority information is used as the priority information of the cell, the redistribution parameter of the cell included in the first priority information should also be used as the redistribution parameter of the cell.

After the priority information and the redistribution parameter of the cell in the radio network area are determined by using the foregoing methods, the cell reselection may be performed based on a priority, the signal quality, and the redistribution parameter of the cell.

This application further provides a communications apparatus, where the communications apparatus may be a terminal or a chip inside a terminal, and the communications apparatus has a function for implementing the method example in the seventh aspect. The function may be implemented by hardware or by hardware executing corresponding software. The hardware or the software includes one or more modules corresponding to the foregoing function.

In a possible design, a structure of the communications apparatus includes a receiving module and a processing module, where the modules may perform the corresponding functions in the foregoing method example. Refer to specific descriptions in the method example for details. The details are not described herein again.

This application further provides a communications apparatus where the communications apparatus may be a terminal or a chip inside a terminal, and the communications apparatus includes function modules for performing steps of the method in the seventh aspect. The communications apparatus includes a communications module and a processor.

The communications module is configured to perform communication interaction with another device, and specifically, configured to receive information about a radio network area configured by an access network device for a terminal, where the radio network area includes one or more cells, and the information about the radio network area includes information used to identify the one or more cells, and where the communications module may be an RF circuit, a WiFi module, a communications interface, a Bluetooth module, and the like.

The processor is configured to implement the functions of the processing module, for example, including: performing cell reselection based on the information about the radio network area.

Optionally, the communications apparatus may further include the memory, configured to store a program and the like. Specifically, the program may include program code, where the program code includes an instruction. The memory may include an RAM and may further include a nonvolatile memory such as at least one magnetic disk storage. The processor executes an application program stored in the memory, to implement the foregoing functions.

In a possible manner, the communications module, the processor, and the memory may be connected to each other through a bus. The bus may be a peripheral component interconnect standard (PCI) bus, an extended industry standard architecture (EISA) bus, or the like. The bus may be classified into an address bus, a data bus, a control bus, and the like.

According to an eighth aspect, this application provides a communication method including: paging a terminal in a radio network area based on information about the radio network area of the terminal, where the radio network area includes one or more cells, and the information about the radio network area includes information used to identify the one or more cells; and sending the information about the radio network area of the terminal to a core network device if determining that the paging fails.

Herein, after the terminal is paged in the radio network area, if a paging response message fed back by the terminal is received, or a response message fed back by another access network device in the radio network area after reception of the paging response message from the terminal is received, it may be determined that the terminal is successfully paged. The response message fed back by the another access network device in the radio network area after reception of the paging response message from the terminal may specifically be a message that is used to request for obtaining a context of the terminal and that is fed back by the another access network device after reception of the paging response message from the terminal.

However, some exceptions may also occur, resulting in that the paging response message fed back by the terminal is not received by an access network device side, and the response message fed back by the another access network device in the radio network area after reception of the paging response message from the terminal is not received. In this case, the access network device side may determine that the paging fails and send information about the radio network area of the terminal to a core network device side.

In a possible design, after the sending information about the radio network area of the terminal to the core network device, the method further includes: deleting context information of the terminal, where the context information of the terminal includes the information about the radio network area.

In this way, if it is determined that the paging fails, it indicates that the information about the radio network area of the terminal may have been invalid. In this case, the context information of the terminal is deleted, so that storage resources can be effectively saved.

In a possible design, after the sending information about the radio network area of the terminal to the core network device, the method further includes: releasing a network connection that corresponds to the terminal and that is between an access network and a core network.

In this way, if it is determined that the paging fails, it indicates that the network connection that corresponds to the terminal and that is between the access network and the core network may have been unavailable. In this case, the network connection that corresponds to the terminal and that is between the access network and the core network is deleted, so that network resources can be effectively saved.

According to a ninth aspect, this application provides a communication method including: receiving information about a radio network area of a terminal sent by an access network device, where the radio network area includes one or more cells, and the information about the radio network area includes information used to identify the one or more cells; and paging, based on the information about the radio network area, the terminal in an area indicated by tracking area TA information other than the radio network area, where the area indicated by the TA information of the terminal may specifically be an area indicated by one or more pieces of TA information of the terminal.

In this way, after the core network device receives the information about the radio network area of the terminal, a radio network area in which the paging by the access network device has failed may be excluded. To be specific, the terminal is paged in the area indicated by the TA information of the terminal other than the radio network area, thereby reducing waste of signaling resources and improving paging efficiency.

In a possible design, after the receiving information about a radio network area of a terminal sent by an access network device, the method further includes: releasing a network connection that corresponds to the terminal and that is between an access network and a core network.

This application further provides a communications apparatus, where the communications apparatus may be an access network device or a chip inside an access network device, and the communications apparatus has a function for implementing the method example in the eighth aspect. The function may be implemented by hardware or by hardware executing corresponding software. The hardware or the software includes one or more modules corresponding to the foregoing function.

In a possible design, a structure of the communications apparatus includes a processing module and a sending module, where the modules may perform the corresponding functions in the foregoing method example. Refer to specific descriptions in the method example for details. The details are not described herein again.

This application further provides a communications apparatus, where the communications apparatus may be an access network device or a chip inside an access network device, and the communications apparatus has a function for implementing the method example in the ninth aspect. The function may be implemented by hardware or by hardware executing corresponding software. The hardware or the software includes one or more modules corresponding to the foregoing function.

In a possible design, a structure of the communications apparatus includes a processing module and a receiving module, where the modules may perform the corresponding functions in the foregoing method example. Refer to specific descriptions in the method example for details. The details are not described herein again.

This application further provides a communications apparatus, where the communications apparatus may be an access network device or a chip inside an access network device, and the communications apparatus has a function for implementing the method example in the eighth aspect. The communications apparatus includes a communications module and a processor.

The communications module is configured to perform communication interaction with another device, where the communications module may be an RF circuit, a WiFi module, a communications interface, a Bluetooth module, and the like.

The processor is configured to implement the functions of the processing module, for example, including: paging a terminal in a radio network area based on information about the radio network area of the terminal, where the radio network area includes one or more cells, and the information about the radio network area includes information used to identify the one or more cells; and sending the information about the radio network area of the terminal to a core network device if determining that the paging fails.

Optionally, the communications apparatus may further include the memory, configured to store a program and the like. Specifically, the program may include program code, where the program code includes an instruction. The memory may include an RAM and may further include a nonvolatile memory such as at least one magnetic disk storage. The processor executes an application program stored in the memory, to implement the foregoing functions.

In a possible manner, the communications module, the processor, and the memory may be connected to each other through a bus. The bus may be a peripheral component interconnect standard (PCI) bus, an extended industry standard architecture (EISA) bus, or the like. The bus may be classified into an address bus, a data bus, a control bus, and the like.

This application further provides a communications apparatus, where the communications apparatus may be a core network device or a chip inside a core network device, and the communications apparatus has a function for implementing the method example in the ninth aspect. The communications apparatus includes a communications module and a processor.

The communications module is configured to perform communication interaction with another device, and specifically, configured to receive information about a radio network area of a terminal sent by an access network device, where the radio network area includes one or more cells, and the information about the radio network area includes information used to identify the one or more cells, and where the communications module may be an RF circuit, a WiFi module, a communications interface, a Bluetooth module, and the like.

The processor is configured to implement the functions of the processing module, for example, including: paging, based on the information about the radio network area, the terminal in an area indicated by tracking area TA information other than the radio network area, where the area indicated by the TA information of the terminal may specifically be an area indicated by one or more pieces of TA information of the terminal.

Optionally, the communications apparatus may further include the memory, configured to store a program and the like. Specifically, the program may include program code, where the program code includes an instruction. The memory may include an RAM and may further include a nonvolatile memory such as at least one magnetic disk storage. The processor executes an application program stored in the memory, to implement the foregoing functions.

In a possible manner, the communications module, the processor, and the memory may be connected to each other through a bus. The bus may be a peripheral component interconnect standard (PCI) bus, an extended industry standard architecture (EISA) bus, or the like. The bus may be classified into an address bus, a data bus, a control bus, and the like.

This application further provides a computer-readable storage medium, where the storage medium stores an instruction, when run on a computer, the instruction enables the computer to implement the communication method according to any one of the foregoing designs.

This application further provides a computer program product including an instruction, when run on a computer, the instruction enables the computer to implement the communication method according to any one of the foregoing designs.

This application further provides a computer program, when run on a computer, the computer program enables the computer to implement the communication method according to any one of the foregoing designs.

DETAILED DESCRIPTION OF ILLUSTRATIVE EMBODIMENTS

The following illustrates this application in detail with reference to accompanying drawings of this specification.

Figure 1:
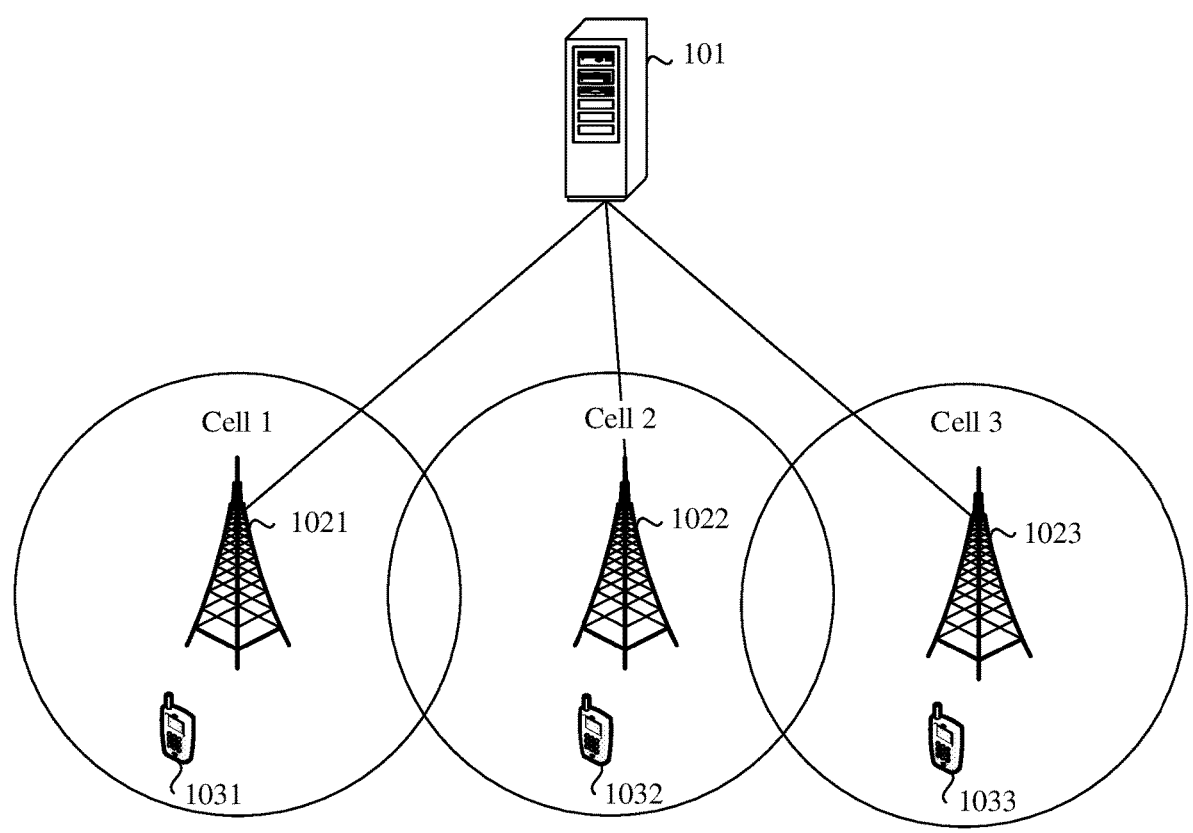
FIG. 1 is a schematic diagram of a system architecture to which this application is applicable.

FIG. 1 is a schematic diagram of a system architecture to which this application is applicable. As shown in FIG. 1, the system architecture includes a core network device 101, one or more access network devices (for example, an access network device 1021, an access network device 1022, and an access network device 1023 as shown in FIG. 1), one or more terminals (for example, a terminal 1031, a terminal 1032, and a terminal 1033 as shown in FIG. 1).

In this application, a radio access network device may be a base station (base station, BS) device. The base station device may also be referred to as a base station, and is an apparatus deployed in a radio access network and configured to provide a radio communications function. For example, a device providing a base station function in a 5G network includes one or more of the following: a new radio NodeB (gNB), a centralized unit (CU), and a distributed unit (Distributed Unit). The terminal is a device having a radio receiving and transmitting function, which may be deployed on land, including an indoor or outdoor device, a hand-held device, or an in-vehicle device; or may be deployed on water (for example, on a steamer); or may be deployed in air (for example, an airplane, a balloon, and on a satellite). The terminal may be a mobile phone, a tablet computer (Pad), a computer having a radio receiving and transmitting function, a virtual reality (VR) terminal, an augmented reality (AR) terminal, a wireless terminal in an industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, and the like.

A coverage area of the access network device may be classified into one or more cells. FIG. 1 briefly shows a cell 1 in a coverage area of the access network device 1021, a cell 2 in a coverage area of the access network device 1022, and a cell 3 in a coverage area of the access network device 1023.

By using the terminal 1032 as an example, after the terminal 1032 accesses the cell 2, the access network device corresponding to the cell 2 may configure the terminal 1032 to enter an inactive state. In this application, the access network device that configures the terminal to enter the inactive state may be referred to as an anchor access network device. For example, the access network device 1022 is an anchor access network device of the terminal 1032. In the following embodiments of this application, a terminal that is in an inactive state is referred to as a terminal in an inactive state for short.

It may be understood that the inactive state in the embodiments of this application may also be referred to as a third state.

For example, the access network device 1022 may send information about a radio network area to the terminal 1032 through dedicated signaling, where the radio network area may include one or more cells, and the information about the radio network area includes information used to identify the one or more cells. The information used to identify the cell may use a cell as granularity, and may further carry frequency information of the cell.

The embodiments of this application describe the information about the radio network area by using a parameter that uses a cell as granularity as an example.

For example, the radio network area includes the cell 1 and the cell 2, and the information about the radio network area includes an identity of the cell 1 and an identity of the cell 2.

It may be understood that in the embodiments of this application, the identity of the cell or a cell identity may include at least one of the following: a global cell identity (GCI) of the cell, a physical cell identity (PCI), a frequency, a synchronization signal (SS) pattern, and beam information of the cell.

In this application, there may be a plurality of specific implementations of sending, by the access network device 1022, the information about the radio network area to the terminal 1032. In an example 1, the access network device 1022 sends the information about the radio network area to the terminal 1032 in a form of a cell list. Table 1 shows schematic content in a cell list.

TABLE 1

| Schematic content in a cell list |
|---|
| Cell identity |
| Cell 1 |
| Cell 2 |

As shown in Table 1, the cell in the cell list is a cell included in the radio network area. In actual applications, other content needs to be added to Table 1 based on requirements.

In an example 2, the access network device 1022 sends an identity (set to a radio network area 1) of the radio network area to the terminal 1032, and the terminal 1032 obtains one or more cells included in the radio network area based on the identity of the radio network area. In this case, each cell may broadcast an identity of the radio network area to which the cell belongs. For example, the cell 1 broadcasts that an identity of the radio network area to which the cell 1 belongs is the radio network area 1, the cell 2 broadcasts that an identity of the radio network area to which the cell 2 belongs is the radio network area 1, and the cell 3 broadcasts that an identity of the radio network area to which the cell 3 belongs is a radio network area 2. In this way, the terminal 1032 may obtain, based on the broadcast of each of the cells, that a cell belonging to the radio network area 1 is the cell 1 and the cell 2, and further determine a cell that is configured by the access network device 1022 for the terminal and that is included in the radio network area.

After receiving the information about the radio network area, the terminal 1032 enters the inactive state. In this case, the terminal 1032 disconnects an RRC connection to the access network device 1022, but a network connection corresponding to the terminal 1032 still exists between the access network device 1022 and a core network device 101.

Because the network connection corresponding to the terminal 1032 still exists between the access network device 1022 and the core network device 101, the core network device 101 directly sends data to the access network device 1022 to which a terminal 1032 in an inactive state is finally connected. Because the access network device 1022 cannot determine whether the terminal 1032 is in a coverage area of the access network device 1032, when UE in an inactive state needs to be paged, the access network device 1022 first pages in the radio network area (that is, the cell 1 and the cell 2). Specifically, the access network device 1022 triggers a RAN-initiated notification and sends the RAN-initiated notification to all access network devices in the radio network area, so that all the access network devices in the radio network area initiate the RAN-initiated notification to page the terminal 1032. Optionally, if the terminal 1032 is not found through paging in the entire radio network area, that is, a response from the terminal 1032 is not received, the access network device 1022 may further interact with the core network device 101, to enable the core network device 101 to initiate paging (CN-initiated paging), so that the terminal 1032 is paged in a larger area (for example, a tracking area (TA) or a tracking area list TA list). For example, a TA area of the terminal 1032 includes the cell 1, the cell 2, and the cell 3, and the core network device may page the terminal in the cell 1, the cell 2, and the cell 3.

Figure 2A:
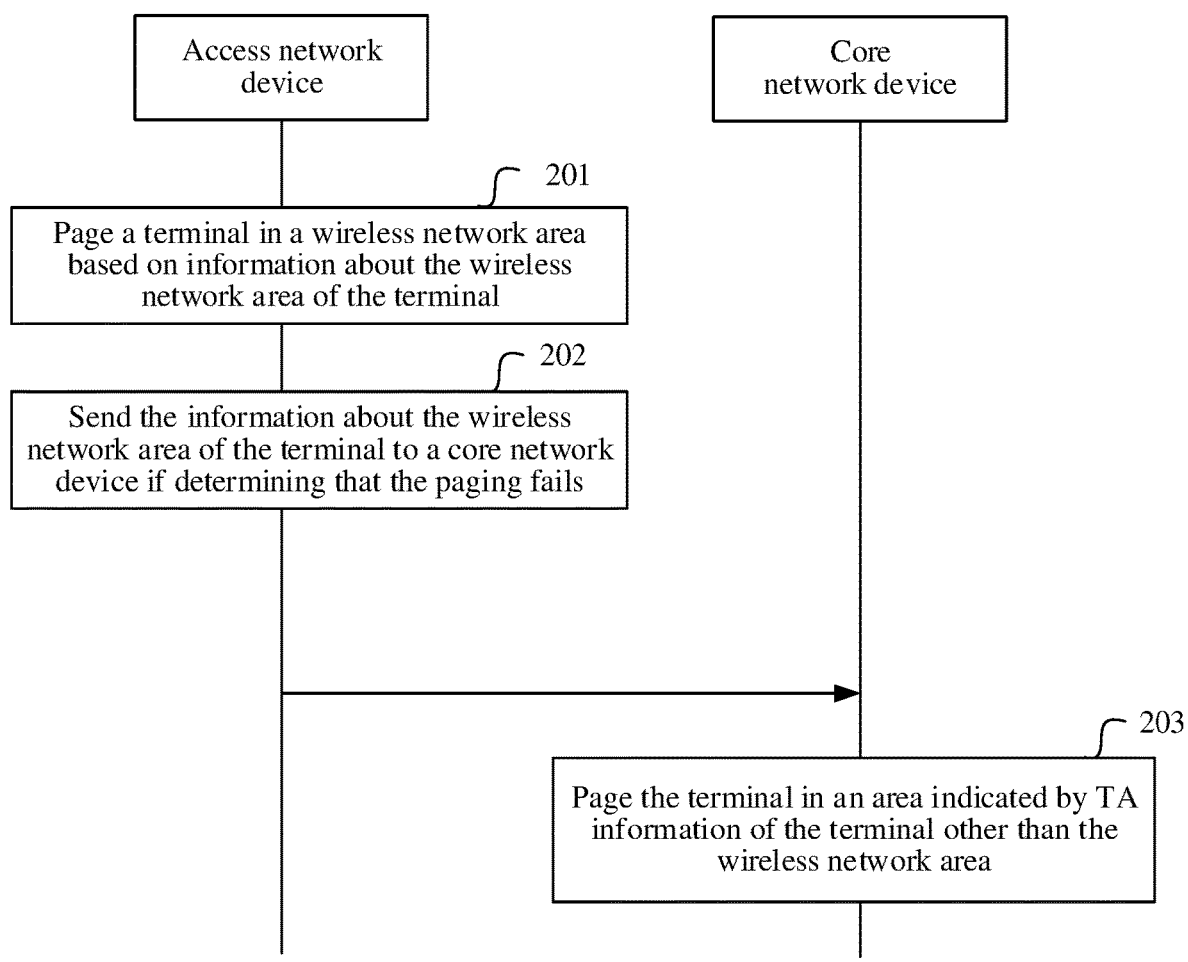
FIG. 2a is a schematic flowchart of a communication method according to this application.

An embodiment of this application provides a solution to effectively prevent signaling overheads caused by repeated paging of a core network device in a radio network area. The following specifically describes a method according to this embodiment of this application with reference to FIG. 2a. As shown in FIG. 2a, a communication method is provided, including the following steps.

Step 201. Page a terminal in a radio network area based on information about the radio network area of the terminal, where the radio network area includes one or more cells, and the information about the radio network area includes information used to identify the one or more cells.

Herein, for a terminal in an inactive state, because a network connection that corresponds to the terminal and that is between an access network and a core network still exists, a core network device side sends downlink data of the terminal to an access network device side, and the access network device side may page the terminal in a radio network area according to the information about the radio network area that is configured for the terminal.

It should be noted that a reason why paging is triggered on the access network device side may be receiving the downlink data, and besides, the paging may be actively triggered by the access network device side. For example, the access network device side wants to release context information of the terminal, or requests the terminal to report location information.

Step 202. Send the information about the radio network area of the terminal to a core network device if determining that the paging fails.

Herein, after paging the terminal in the radio network area, the access network device side may determine that the terminal is successfully paged if receiving a paging response message fed back by the terminal or receiving a response message fed back by another access network device in the radio network area after reception of a paging response message from the terminal, and send the received downlink data to the terminal. The response message fed back by the another access network device in the radio network area after reception of the paging response message from the terminal may specifically be a message that is used to request for obtaining a context of the terminal and that is fed back by the another access network device after reception of the paging response message from the terminal.

However, some exceptions may also occur, resulting in that the paging response message fed back by the terminal is not received by the access network device side, and the response message fed back by the another access network device in the radio network area after reception of the paging response message from the terminal is not received. In this case, the access network device side may determine that the paging fails and send information about the radio network area of the terminal to the core network device side.

Further, the access network device side may further delete context information of the terminal. The context information of the terminal includes the information about the radio network area.

Correspondingly, the core network device side receives the information about the radio network area of the terminal sent by the access network device side.

Optionally, after the core network device side receives the information about the radio network area of the terminal, if it is determined that paging needs to be initiated this time, step 203 is performed.

Step 203. Page the terminal in an area indicated by TA information of the terminal other than the radio network area.

Herein, after the access network device side receives the information about the radio network area of the terminal, if it is determined that paging needs to be initiated this time, a radio network area in which the paging by the access network device side has failed is excluded. To be specific, the terminal is paged in the area indicated by the TA information of the terminal other than the radio network area, thereby reducing waste of signaling resources and improving paging efficiency.

The area indicated by the TA information of the terminal may specifically be an area indicated by one or more pieces of TA information of the terminal.

If the core network device side determines that the paging does not need to be initiated this time, the terminal may be not paged temporarily. When the paging needs to be initiated subsequently, the terminal is paged in the area indicated by the TA information of the terminal other than the radio network area.

It should be noted that step 201 and step 202 may be implemented by the access network device or a chip inside the access network device, and step 203 may be implemented by the core network device or a chip inside the core network device.

The following describes step 201 to step 203 in detail by using the terminal 1032 as an example. The terminal in step 201 to step 203 may specifically be the terminal 1032 in FIG. 1, a first access network device in step 201 to step 203 is the access network device 1022 in FIG. 1, and the core network device in step 201 to step 203 is the core network device 101 in FIG. 1. The radio network area includes a cell 1 and a cell 2.

As shown in 2b, after the downlink data arrives, the core network device 101 sends the data to the access network device 1022 to which a terminal 1032 in an inactive state is finally connected.

The access network device 1022 pages the terminal 1032 in the radio network area. For a specific paging manner, refer to the foregoing descriptions.

If the terminal 1032 is not found through paging in the entire radio network area by the access network device 1022, a network connection release process of the terminal 1032 is initiated between the access network device 1022 and the core network device 101.

A specific release process may be that the access network device 1022 initiates a release request, and the core network device 101 decides to perform releasing; or the access network device 1022 initiates a release instruction, and the core network device 101 performs the release process based on the release instruction. The specific release process is not limited in this application. Regardless of which of the foregoing release processes is used, the access network device 1022 sends signaling to the core network device 101. To prevent unnecessary waste of signaling brought by a case in which the terminal 1032 is paged again (signaling shown by a dashed line in FIG. 2b) in the radio network area during CN-initiated paging, the access network device 1022 may send the information about the radio network area of the terminal 1032 to the core network device 101 in the network connection release process.

After the network connection corresponding to the terminal 1032 is released, the terminal 1032 enters an idle state from the perspective of a network, and if the core network device 101 still needs to page the terminal 1032, the CN-initiated paging is initiated. Because the core network device 101 receives the information about the radio network area of the terminal 1032, when the CN-initiated paging is initiated, the radio network area can be avoided, and the CN-initiated paging is only initiated in an area in the TA or the TA list area other than the radio network area. To be specific, the CN-initiated paging is sent to other access network devices (that is, the access network device 1023) in the TA or the TA list other than the radio network area, so that the access network devices continue to page UE, thereby effectively preventing repeated paging in the radio network area and saving signaling resources.

The above content specifically describes, from the perspective of the core network device and the access network device, an implementing process of paging the terminal after the terminal enters the inactive state. For "the terminal is not found through paging in the entire radio network area" mentioned in step 203, upon analysis performed from the perspective of the terminal, reasons may include at least one of the following: (1) the terminal moves out of the radio network area, but the access network device is not notified in time; (2) the terminal moves out of the radio network area, but is detected to be in an out-of-service state, and an update of the radio network area cannot be initiated; (3) the terminal is still in the radio network area, but is detected to be in an out-of-service state, resulting in that the paging cannot be received or the paging response cannot be initiated. Being detected to be in an out-of-service state may specifically be that the terminal cannot find, based on measurement configuration information sent by a network side, a suitable cell for residence within a specified time. It may be understood that a length of time of the foregoing specified time is not limited in the embodiments of this application.

Figure 3:
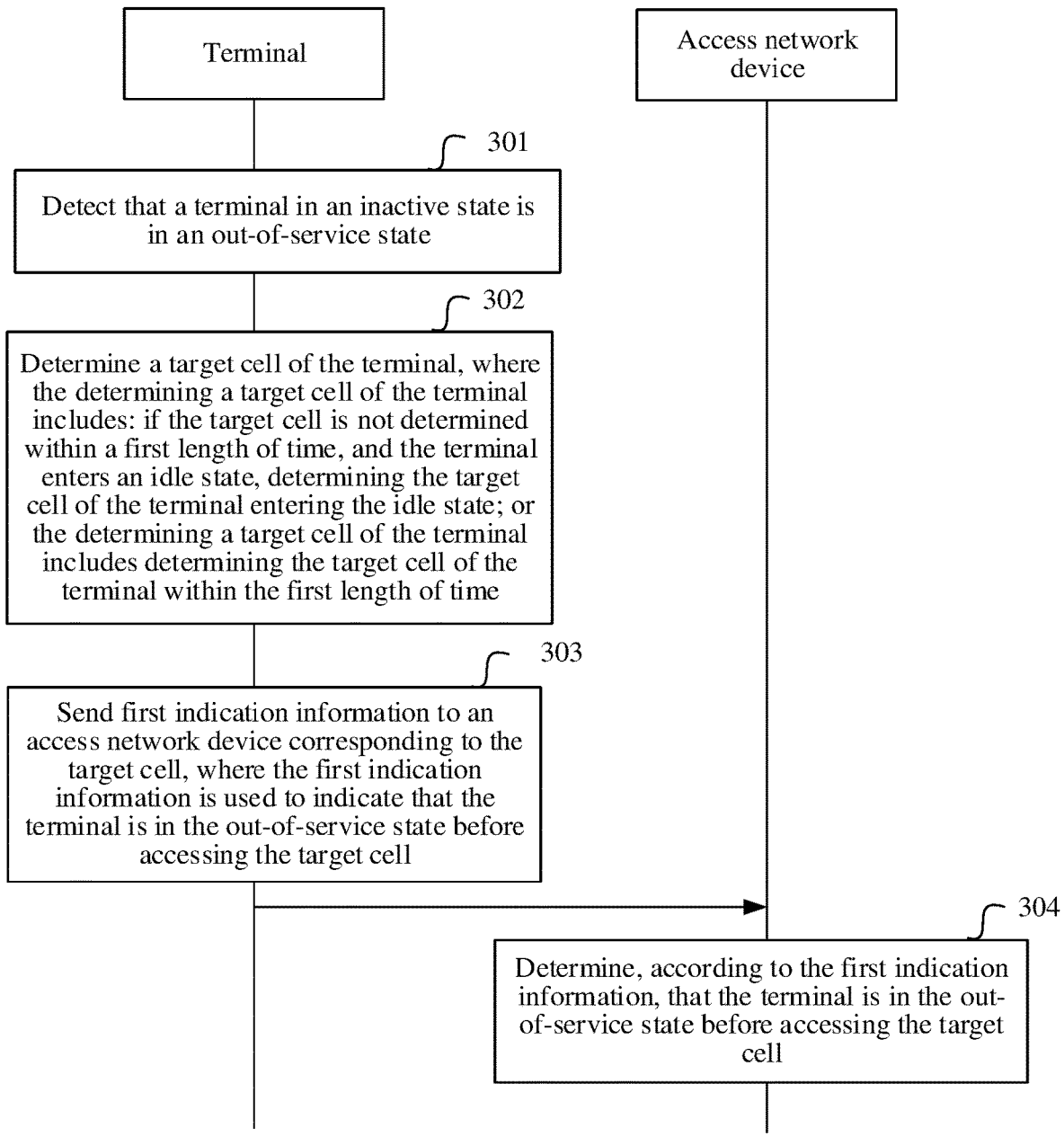
FIG. 3 is a schematic flowchart corresponding to a communication method according to this application.

Optionally, a processing manner after a terminal in an inactive state is in an out-of-service state is provided in another embodiment of this application. FIG. 3 is a schematic flowchart corresponding to a communication method according to this embodiment of this application. As shown in FIG. 3, the method may include the following steps.

Step 301. Detect that a terminal in an inactive state is in an out-of-service state.

Herein, for the terminal in the inactive state, if the terminal does not find a suitable cell within a specified time, it may be considered that the terminal is in the out-of-service state. When the terminal is detected to be in the out-of-service state, step 302 may be performed.

Step 302. Determine a target cell of the terminal.

When the terminal in the inactive state is in the out-of-service state, to enable the terminal to return a network again, cell selection or cell reselection may be performed, to further determine the target cell for the terminal.

The determining a target cell of the terminal includes: determining the target cell of the terminal entering an idle state if the target cell is not determined within a first length of time, where the terminal enters the idle state after the first length of time expires; or the determining a target cell of the terminal includes determining the target cell of the terminal within the first length of time.

Step 303. Send first indication information to an access network device corresponding to the target cell, where the first indication information is used to indicate that the terminal is in the out-of-service state before accessing the target cell.

Herein, after the terminal resides in the target cell determined in step 302, the terminal may report, to the access network device corresponding to the target cell, that the terminal is in the out-of-service state before accessing the target cell, which may be understood as that the access network device is notified of a reason why the terminal accesses a network.

Correspondingly, an access network device side receives the first indication information.

Step 304. Determine, according to the first indication information, that the terminal is in the out-of-service state before accessing the target cell.

After the access network device side receives the first indication information, it may be learned, by parsing the first indication information, that the terminal is in the out-of-service state before accessing the target cell.

It should be noted that step 301 to step 303 may be implemented by a communications apparatus. The communications apparatus may be the terminal or a chip inside the terminal, and step 304 may be implemented by the access network device or a chip inside the access network device.

It may be understood that when the communications apparatus is the chip inside the terminal, before the communications apparatus receives or sends information, the information is likely to subject to processing performed by another module inside the terminal, for example, frequency conversion performed by a radio frequency module. This is not limited in this embodiment of this application.

It can be learned of from the above content that the terminal sends the first indication information to the access network device after the terminal in the out-of-service state accesses the network again, so that the access network device can learn, according to the first indication information in time, that the terminal is in the out-of-service state before accessing the target cell, and the access network device may learn of a reason why the terminal accesses the network.

Specifically, in step 301 and step 302, after it is detected that the terminal in the inactive state is in the out-of-service state, the terminal may perform cell selection or cell reselection, and the selected cell is the target cell.

Optionally, when the terminal in the inactive state is detected to be in the out-of-service state, a timer can be started up, and a length of time of the timer is the first length of time. The first length of time may be configured by the network for the terminal or predefined by a protocol. The timer may be configured to determine whether the terminal needs to continue to reserve the inactive state or configured to control a timing of entering the idle state by the terminal, or the timer may further have other effects.

It may be understood that the time is optional, or the timer may be not required. For example, when there is no timer, in a possible implementation, the terminal directly enters the idle state after being detected to be in the out-of-service state.

In this application, in consideration of that a case in which the terminal does not find a suitable cell for a long time may occur, if the terminal still stores context information, waste of storage resources in the terminal is caused. Alternatively, if the access network device stores context information when the terminal does not find a suitable cell for a long time, waste of storage resources in the access network device is also caused. Therefore, whether the terminal finds the suitable cell within the first length of time may be measured by starting the timer. If the terminal cannot find the suitable cell within the first length of time, the context information may be cleared after the timer expires, and the terminal enters the idle state.

In step 303, there may be a plurality of implementations of sending the first indication information by the terminal. For example, the first indication information is carried by using signaling or a message. For example, the terminal may send the first indication information through RRC signaling. Further, in different scenarios, the RRC signaling may be an RRC connection setup request message or an RRC connection resume request message. The first indication information may be an information element indicating an access reason, and may specifically indicate re-entering a service area (re-enter service), so that the access network device may obtain an access reason of the terminal by parsing the first indication information.

Optionally, the first indication information may further include other information, such as location information, time information, duration information of the out-of-service state, start time information of the out-of-service state, and the like, of the terminal in the out-of-service state.

In step 304, the access network device receives the first indication information, learns that the terminal is in the out-of-service state before accessing the target cell, and may further update a state of the terminal according to the first indication information. For example, the state of the terminal is updated to a connected state, the idle state, the inactive state, or the like, to facilitate subsequently normally paging or finding the terminal.

Figure 4A:
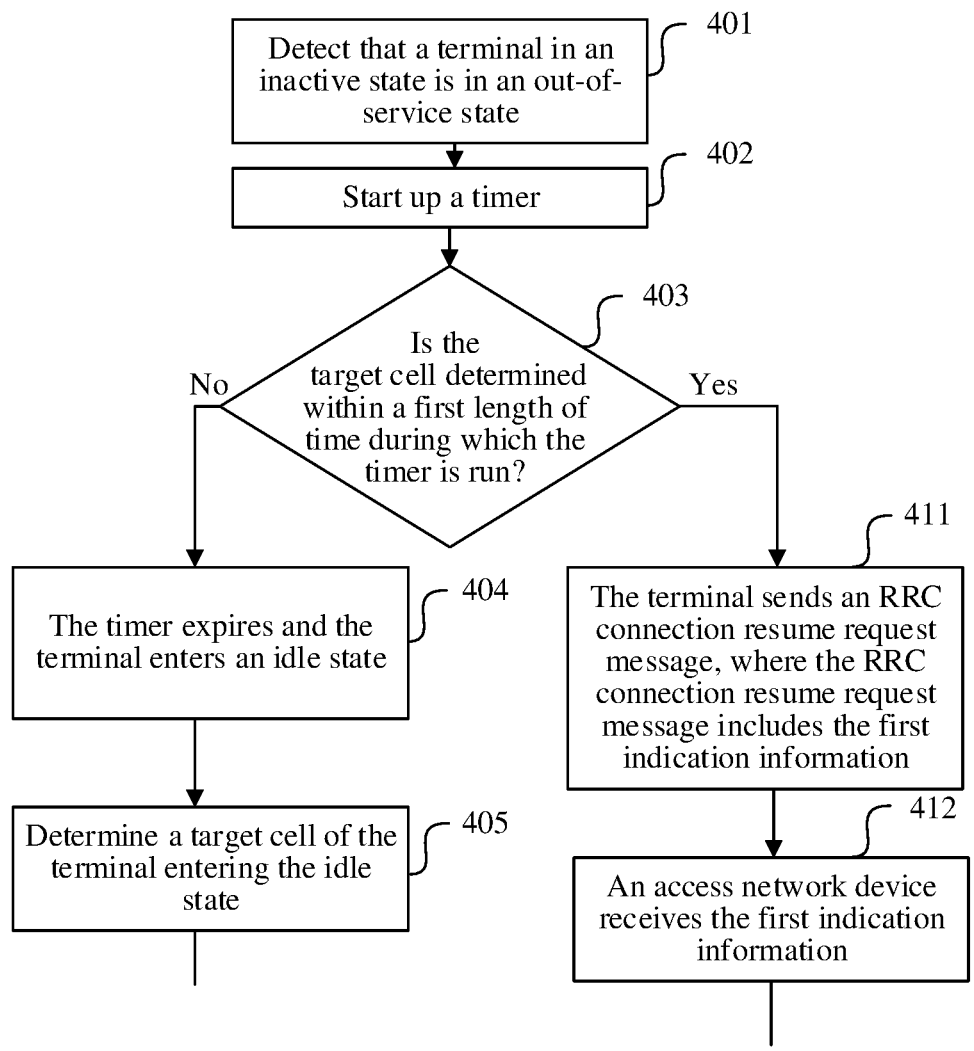
FIG. 4A and FIG. 4B are an entire schematic flowchart corresponding to a communication method according to this application.
Figure 4B:
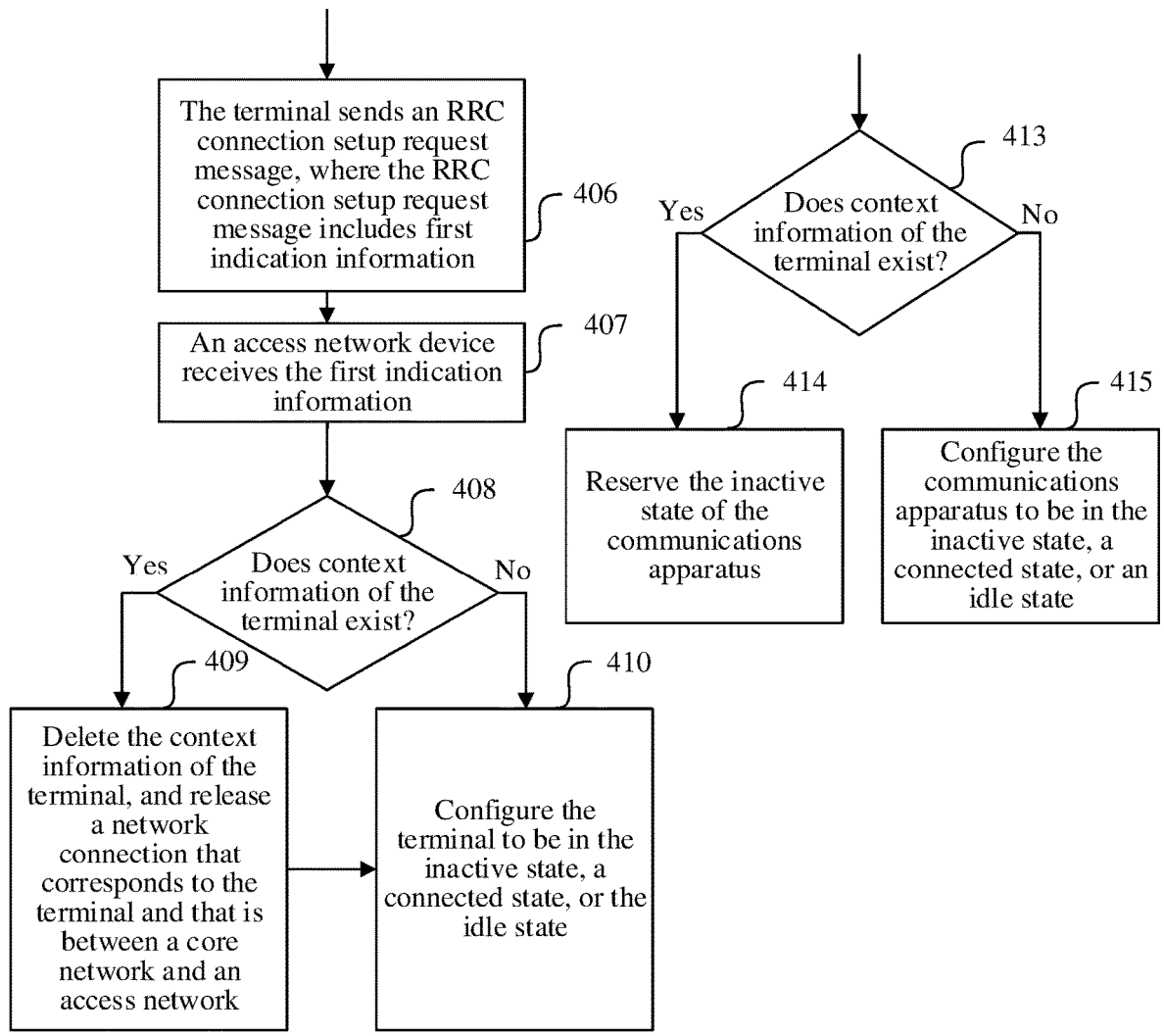

The following describes the foregoing communication method in detail with reference to FIG. 4A and FIG. 4B. In the following embodiment, an example in which the communication method is implemented by the terminal and the access network device is used for description.

Step 401. Detect that a terminal in an inactive state is in an out-of-service state.

Step 402. The terminal starts up a timer.

A time length of the timer is a first length of time.

After the timer is started up, there may be two cases. In a first case, the terminal does not determine a target cell within the first length of time during which the timer is run. In a second case, the terminal determines a target cell of the terminal within the first length of time during which the timer is run.

Step 403. Determine whether the target cell is determined within the first length of time during which the timer is run, and if the target cell is not determined within the first length of time, perform step 404, or if the target cell is determined within the first length of time, perform step 411.

Step 404 to step 410 are steps possibly performed if the target cell is not determined within the first length of time.

Step 404. If the target cell is not determined within the first length of time during which the timer is run, that is, a suitable cell is not found, the timer expires, and the terminal enters an idle state.

In this application, that the terminal enters the idle state specifically indicates that the terminal clears context information. The context information may include at least one of the following: information that is sent by an anchor access network device to the terminal and that is about a radio network area, signaling radio bearer (SRB) configuration information, and data radio bearer (DRB) configuration information. Optionally, step 405 may be performed after step 404.

Step 405. Determine a target cell of the terminal entering the idle state.

In this case, the terminal entering the idle state may determine the target cell through a process of cell reselection or cell selection.

Step 406 is performed after step 405.

Step 406. The terminal sends an RRC connection setup request message to an access network device corresponding to the target cell, where the RRC connection setup request message includes first indication information.

For content of the first indication information, refer to the related descriptions of the foregoing embodiments. Details are not described herein again.

Step 407. The access network device receives the first indication information.

The access network device may determine, according to the first indication information, that the terminal is in the out-of-service state before accessing the target cell.

In this application, the access network device may further determine current location information of the terminal based on the RRC connection setup request message. Optionally, step 408 may be performed after step 407.

Step 408. The access network device determines whether context information of the terminal exists, and if the context information of the terminal exists, perform 409, or if the context information of the terminal does not exit, perform 410.

Step 409. Delete the context information of the terminal, and release a network connection that corresponds to the terminal and that is between a core network and an access network.

In this application, that the access network device determines that the context information of the terminal exists may indicate that the access network device determines that the context information of the terminal is stored in the access network device (in this case, the access network device is the anchor access network device of the terminal). In this case, the access network device may directly delete the context information of the terminal, and release a corresponding network connection between a core network and an access network.

There may be a plurality of specific implementations of releasing the corresponding network connection between the core network and the access network. In an example 1, the access network device sends a release request to a core network device, and the core network device decides, based on the release request, to release the network connection corresponding to the terminal. In an example 2, the access network device sends a release instruction to the core network device, and the core network device performs, based on the release instruction, an operation of releasing the network connection corresponding to the terminal. A specific release process is not limited in this application.

That the access network device determines that the context information of the terminal exists may further indicate that the access network device determines that the context information of the terminal is stored by another access network device (in this case, the access network device is not the anchor access network device of the terminal, but the another access network device storing the context information of the terminal is the anchor access network device of the terminal). In this case, the access network device sends second indication information to the another access network device, where the second indication information is used to instruct the another access network device to delete the context information of the terminal, and release the network connection that corresponds to the terminal and that is between the core network and the access network.

Optionally, step 410 may be performed after step 409.

Step 410. Configure the terminal to be in the inactive state, a connected state, or the idle state.

In this case, the access network device may configure, based on information, such as a service type and a service volume, of the terminal, the terminal to enter the inactive state, the connected state, or the idle state. For example, the terminal does not have any service request and is only configured to send the first indication information, the access network device may configure the terminal to be in the idle state. Alternatively, to prevent signaling overheads of converting the terminal from the idle state to the connected state, the access network device may configure the terminal to be in the inactive state. If the terminal has a service request or a large service volume, the access network device may configure the terminal to be in the connected state. In this way, the access network device can better select a state of the terminal, thereby avoiding an unnecessary state conversion process, and reducing signaling overheads in a state conversion process.

The following steps 411 to 415 are steps possibly performed if the target cell is determined within the first length of time.

Step 411. The terminal sends an RRC connection resume request message to an access network device corresponding to the target cell, where the RRC connection resume request message includes the first indication information.

Step 412. The access network device receives the first indication information.

The access network device may determine, according to the first indication information, that the terminal is in the out-of-service state before accessing the target cell.

Optionally, the access network device may further determine current location information of the terminal based on the RRC connection resume request message. Optionally, step 413 may be performed after step 412.

Step 413. Determine whether the context information of the terminal exists, and if yes, perform 414, or if not, perform 415.

Step 414. Reserve the inactive state of the terminal.

In this application, that the access network device determines that the context information of the terminal exists may indicate that the access network device determines that the context information of the terminal is stored in the access network device (in this case, the access network device is the anchor access network device of the terminal). In this case, the access network device may directly reserve the inactive state of the terminal. Alternatively, the access network device may configure the terminal to enter the inactive state again, that is, re-configure information about a radio network area for the terminal.

If determining that the context information of the terminal is not stored in the access network device, the access network device may obtain the context information of the terminal from another access network device. If determining that the context information of the terminal is stored in the another access network device, the access network device obtains the context information of the terminal and reserves the inactive state of the terminal (in this case, the access network device is not the anchor access network device of the terminal, but the another access network device storing the context information of the terminal is the anchor access network device of the terminal).

It may be understood that the access network device may further configure the terminal to enter the connected state or the idle state. For example, the terminal does not have any service request and is only configured to send the first indication information, the access network device may configure the terminal to be in the idle state. If the terminal has a service request or a large service volume, the access network device may configure the terminal to be in the connected state. The access network device may configure, based on the information, such as a service type or a service volume, of the terminal, the terminal to enter the inactive state, the connected state, or the idle state, thereby better selecting a state suitable for the terminal, avoiding an unnecessary state conversion process, and reducing signaling overheads in a state conversion process.

Step 415. If the access network device does not obtain the context information of the terminal (for example, the context information of the terminal is not stored in the access network device, and the context information of the terminal is not stored in the another access network device either, resulting in that the access network device does not obtain the context information of the terminal), the access network device may configure the terminal to be in the inactive state, the connected state, or the idle state.

For example, the access network device may configure, based on the information, such as a service type or a service volume, of the terminal, the terminal to enter the inactive state, the connected state, or the idle state, thereby better selecting a state suitable for the terminal, avoiding an unnecessary state conversion process, and reducing signaling overheads in a state conversion process.

It can be learned from the above content that a processing manner after the terminal in the inactive state is in the out-of-service state is provided in this application. Specifically, the terminal may start the timer. If the target cell is not determined within the first length of time during which the timer is run, because the terminal is in the out-of-service state for a long time, inactive state configuration information may be cleared, and the terminal may enter the idle state, thereby saving storage space. After the target cell is subsequently determined, the RRC connection setup request message may be sent to the access network device, to help the access network device re-configure the state of the terminal. If the terminal determines the target cell within the first length of time, it indicates that the terminal is in the out-of-service state for a short time, and the inactive state configuration information is still effective. Therefore, the terminal may send the RRC connection resume request message to the access network device, and the inactive state of the terminal is reserved by the access network device, to facilitate subsequently normally paging or finding the terminal.

Figure 2B:
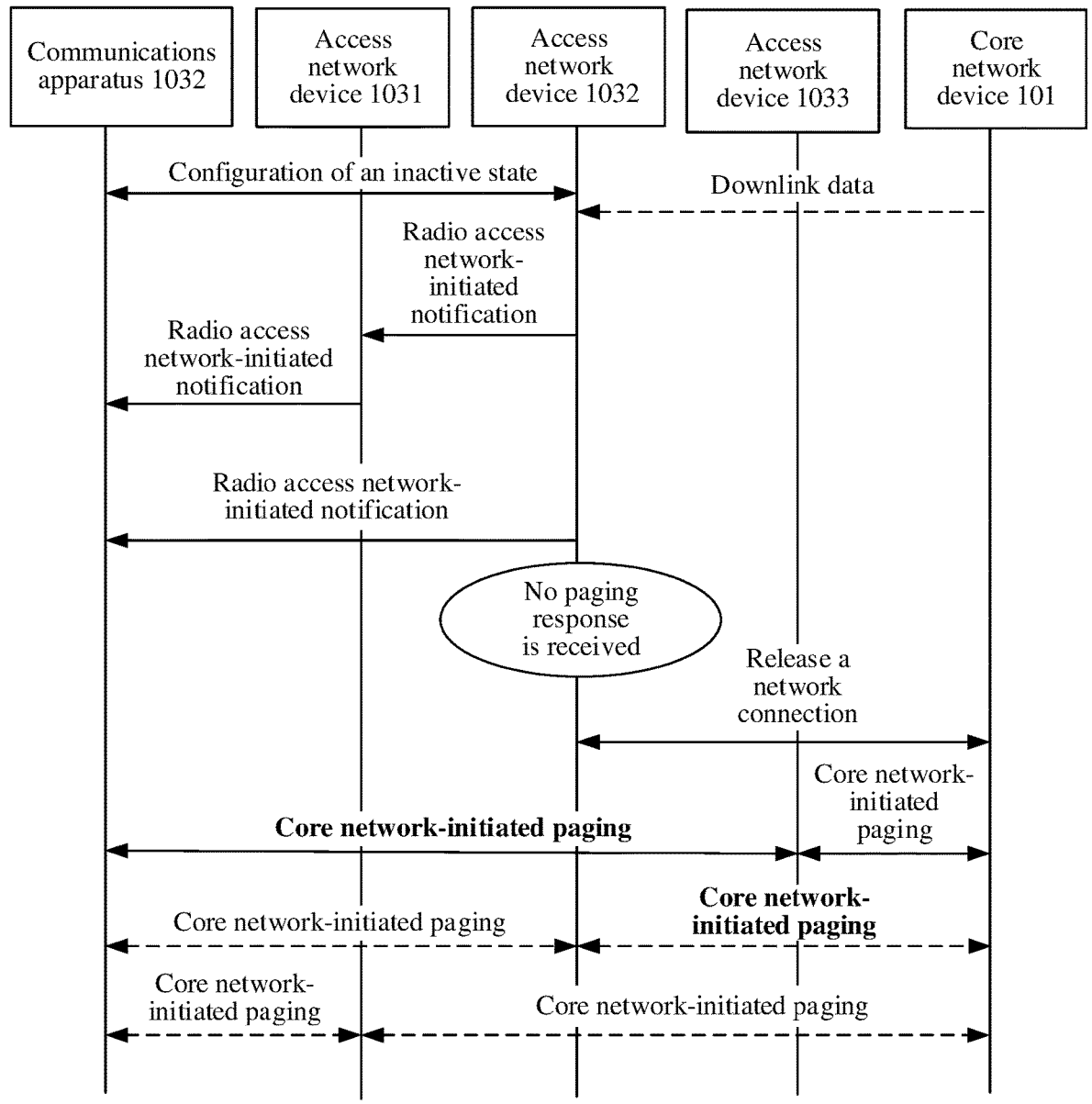
FIG. 2b is a specific schematic flowchart of paging a terminal in an inactive state according to this application.

Optionally, in this application, the communication method as shown in FIG. 3 may be applicable to the scenario shown in FIG. 2a to FIG. 2b. Specifically, in the communication method shown in FIG. 2a to FIG. 2b, when the access network device pages the terminal in the radio network area, if the terminal is in the out-of-service state (for example, because of the reason 2 and the reason 3 described above), the terminal cannot be normally found through paging by the access network device and the core network device. Specifically, if the terminal is not found through paging in the radio network area because of the reason (2), the method in FIG. 2a to FIG. 2b is adopted. Because the terminal has moved out of the radio network area, no problem is brought by a case in which the access network device does not initiate paging in the radio network area, but the terminal may possibly be out found through paging because the terminal is in the out-of-service state. If the terminal is not found through paging in the radio network area because of the reason (3), the method in FIG. 2a to FIG. 2b is adopted. Because the terminal is still in the radio network area, the core network device does not initiate paging in the radio network area, and consequently, the terminal may possibly be never found through paging. However, the processing manner after the terminal in the inactive state is in the out-of-service state described in FIG. 3 in this embodiment of this application enables the terminal to return the network again, so that a problem that the terminal cannot be normally found through paging by using the method in FIG. 2a to FIG. 2b because the terminal is in the out-of-service state can be effectively resolved. It may be understood that in addition to the scenario in which the terminal cannot be normally found through paging exemplified above, other scenarios may further exist, which are not exemplified one by one for description in this embodiment of this application.

In an existing long term evolution (LTE) system, a load balancing technology is introduced for a terminal in an idle state, and a problem of uneven residence of the terminal in the idle state between frequencies is prevented by defining a plurality of frequency priorities. To further enable some terminals to reselect an adjacent frequency or an adjacent cell, a redistribution parameter of frequencies or adjacent cells is further introduced in the LTE. For a serving frequency or a serving cell, a corresponding redistribution parameter is also allocated. The access network device may send frequency priorities and a redistribution parameter of cells to terminals by using a paging message or a system message, so that the terminals can select a resident frequency or cell as evenly as possible based on the frequency priorities and the redistribution parameter of the cells.

However, the access network device configures the information about the radio network area for the terminal in the inactive state through dedicated signaling. Therefore, when the terminal in the inactive state moves inside the radio network area, the context information of the terminal may be directly transferred between the different access network devices in the radio network area without passing through the core network device. Therefore, if the terminal in the inactive state reselects a cell included in the radio network area, the context information of the terminal is forwarded without passing through the core network device, thereby reducing the signaling overheads.

In consideration of that the terminal in the inactive state receives the frequency priorities and the redistribution parameter of the cells that are sent by the access network device, if the terminal performs cell reselection based on the frequency priorities and the redistribution parameter of the cells, a cell outside the radio network area is likely to be reselected by the terminal. In this case, the context information of the terminal needs to be forwarded between the access network devices through the core network device, resulting in signaling overheads and a latency, and forwarding of the context information of the terminal is likely to fail. Consequently, user experience is further affected. Based on this, this application provides a cell reselection method, to prevent a problem of a relatively large quantity of signaling overheads and a relatively long latency from being caused by reselecting a cell outside the radio network area when the terminal in the inactive state moves inside the radio network area.

Figure 5:
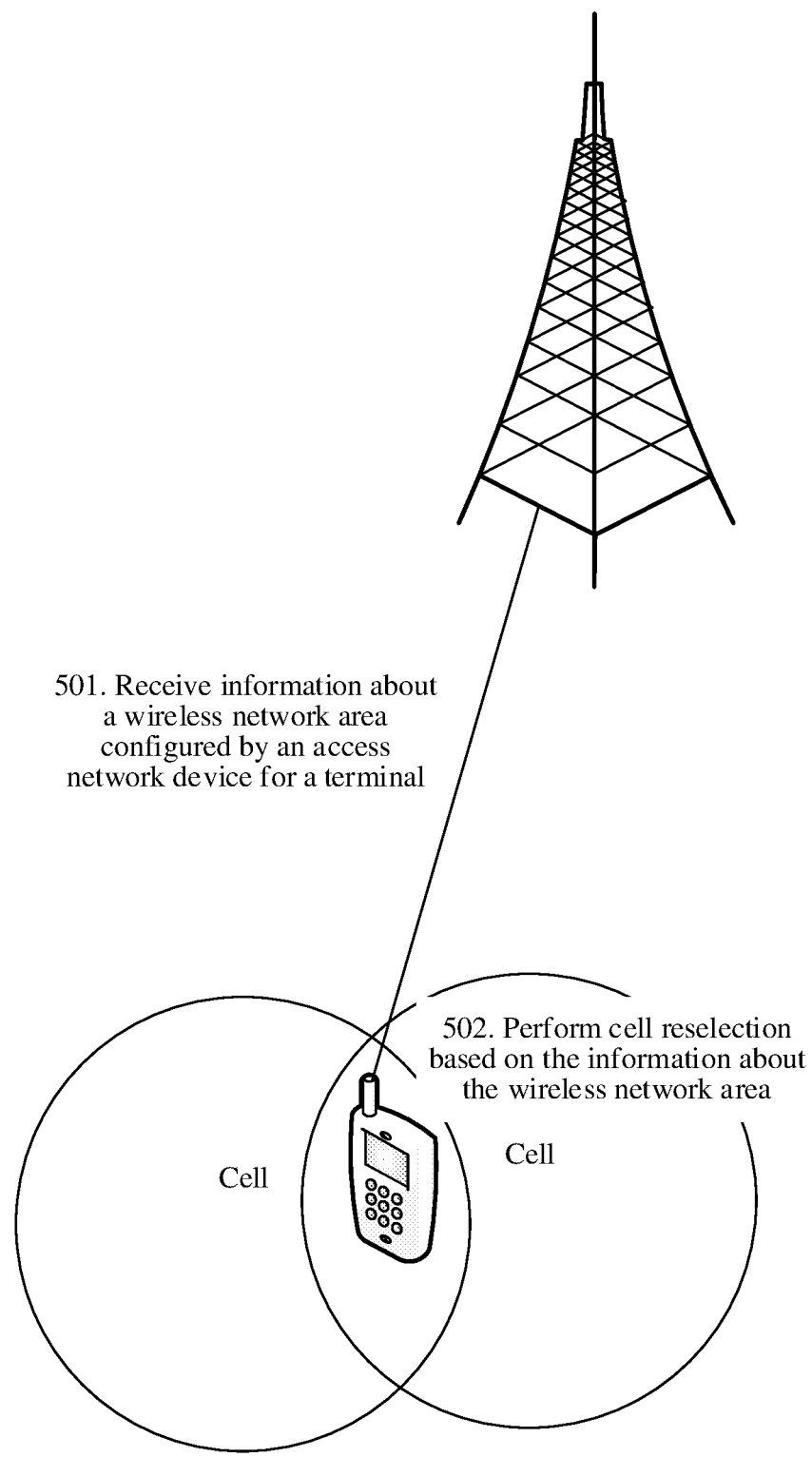
FIG. 5 is a schematic diagram corresponding to a cell reselection method according to this application.

FIG. 5 is a schematic flowchart corresponding to a cell reselection method according to this application. The method may be performed by a terminal or a chip inside a terminal. As shown in FIG. 5, the method may include the following steps.

Step 501. Receive information about a radio network area configured by an access network device for a terminal.

Herein, the radio network area includes one or more cells, and the information about the radio network area includes information used to identify the one or more cells, that is, an identity of the cell. The identity of the cell may specifically include a cell global identity (CGI) of the cell, a physical cell identity (PCI), and a cell identity (cell identity).

Step 502. Perform cell reselection based on the information about the radio network area.

In this application, when the terminal moves inside the radio network area, the cell reselection may be performed based on the received information about the radio network area sent by the access network device, so that a cell/frequency in the radio network area can be selected as preferentially as possible, thereby effectively preventing a problem of a relatively large quantity of signaling overheads and a relatively long latency from being caused by preferentially reselecting a cell outside the radio network area.

Optionally, the information about the radio network area may further include first priority information, where the first priority information includes priority information of the one or more cells/frequencies included in the radio network area. Optionally, the first priority information may include a reselection priority of the cell/frequency, and may further include at least one of: a reselection sub-priority of the cell/frequency, a frequency redistribution parameter, and a cell redistribution parameter.

Optionally, the terminal may further receive second priority information sent by the access network device by using a system broadcast message or dedicated signaling. Optionally, the second priority information may include a reselection priority of the cell/frequency, and may further include at least one of: a reselection sub-priority of the cell/frequency, a frequency redistribution parameter, and a cell redistribution parameter. Specific content included in the second priority information is not limited in this application, and a person skilled in the art may configure, based on actual requirements, the second priority information to include one or more types of information described above. Optionally, the second priority information sent by using the system broadcast message may include information similar to a conventional common priority, and the second priority information sent by using the dedicated signaling may include information similar to a conventional dedicated priority. In a possible implementation, when performing cell reselection, the terminal may first ignore the second priority information, and perform the cell reselection based on the information about the radio network area, or preform the cell reselection by comprehensively considering the information about the radio network area and the second priority information. Based on this, this application may have a plurality of possible implementations, and four manners are described below in detail.

It may be understood that the corresponding cell/frequency in the second priority information may or may not overlap with one or more cells/frequencies included in the radio network area, for example, may be a cell/frequency included in a list of adjacent cells. The "overlap" above may refer to completely overlapping or partially overlapping.

The following embodiment describes the priority information and the information about the radio network area by using a cell as granularity, and by using an example in which the priority information includes the cell priority and the cell redistribution parameter.

Manner 1: The terminal receives the information about the radio network area configured by the access network device for the terminal and performs cell reselection based on signal quality of the one or more cells in the radio network area.

Specifically, the terminal obtains the signal quality of the one or more cells, may select, based on the signal quality of the one or more cells in the radio network area, a cell (specified as a cell 1-1) having best signal quality from the one or more cells, and reselects the cell 1-1.

Further, in consideration of that the cell 1-1 may be not suitable for accessing, the terminal may first determine whether the cell 1-1 is suitable for accessing after selecting the cell 1-1 having the best signal quality. If the cell 1-1 is not suitable for accessing, the terminal may quit reselecting the cell 1-1, select a cell (specified as a cell 1-2) having the best signal quality from the one or more cells other than the cell 1-1, and reselect the cell 1-2 after determining that the cell 1-2 is suitable for accessing.

Optionally, if the information about the radio network area received by the terminal further includes a redistribution parameter of the one or more cells in the radio network area configured by the access network device for the terminal, the terminal may determine, based on the signal quality and the redistribution parameter of the one or more cells in the radio network area, a cell 1-3 satisfying a condition, and reselect the cell 1-3.

Further, in consideration of that the cell 1-3 may be not suitable for accessing, the terminal may first determine whether the cell 1-3 is suitable for accessing after selecting the cell 1-3 satisfying the condition. If the cell 1-3 is not suitable for accessing, the terminal may quit reselecting the cell 1-3, further determine a suitable cell (specified as a cell 1-4) from the one or more cells other than the cell 1-3 based on the redistribution parameter, and reselect the cell 1-4 after determining that the cell 1-4 is suitable for accessing.

For example, the radio network area includes a cell 1a, a cell 1b, a cell 1c, and a cell 1d. The terminal may select a cell having the best signal quality from the cell 1a, the cell 1b, the cell 1c, and the cell 1d, and reselect the cell. If the information about the radio network area received by the terminal further includes a redistribution parameter of the cell 1a, the cell 1b, the cell 1c, and the cell 1d configured by the access network device for the terminal, the terminal may alternatively determine, based on the signal quality and the redistribution parameter of the cell in the radio network area, a cell satisfying the condition, and reselect the cell.

The following describes a specific process of performing cell reselection based on the signal quality and the redistribution parameter of the cell 1a, the cell 1b, the cell 1c, and the cell 1d by using an example.

A cell of which the signal quality satisfies a requirement (the signal quality is greater than a preset signal quality threshold) in the cell 1a, the cell 1b, the cell 1c, and the cell 1d includes the cell 1a, the cell 1b, and the cell 1c. A serving cell of UE 1 is a cell 0, a redistribution factor redistrFactor[0] of the cell 0=5, a redistribution factor redistrFactor[1a] of the cell 1a=4, a redistribution factor redistrFactor[1b] of the cell 1b=6, and a redistribution factor redistrFactor[1c] of the cell 1c=5. A sum total redistrFactor of all the redistribution factors is 5+4+6+5=20.

A distribution range redistrRange[0] of the serving cell=redistrFactor[0]/total redistrFactor=5/20=0.25.

UE ID=(IMSI mod 100)*2+1.

Assuming that a remainder of an IMSI of the UE 1 mod 100 is 5, UE ID=5*2+1=11<=200*redistrRange[0]=50. In this case, the UE 1 reselects the cell 0.

Similarly, it may be obtained that redistrRange[1a] of the cell 1a=4/20=0.2;

redistrRange[1b] of the cell 1b=6/20=0.3; and
redistrRange[1c] of the cell 1c=5/20=0.25.

If a remainder of an IMSI of UE 2 mod 100 is 50, UE ID2=2*50+1=101; in this case, the following is matched:
(redistrRange[0]+redistrRange[1a])
*200=0.45*200=90<101<=(redistrRange[0]+redistrRange[1a]+redistrRange[1b])*200=0.75*200=150.

Therefore, the UE 2 reselects the cell 1b.

Manner 2: The information about the radio network area received by the terminal further includes first priority information, where the first priority information includes priority information of one or more cells included in the radio network area, so that the terminal may perform cell reselection based on the first priority information of the one or more cells.

Specifically, referring to the descriptions of the foregoing content, the information about the radio network area may be in a form of a cell list, and the cell list may further include the first priority information. Table 2 shows schematic content in the cell list including the first priority information.

TABLE 2

Schematic content of first priority information

| Cell identity | Priority information of a cell |
| --- | --- |
| Cell 2-1 | 2 |
| Cell 2-2 | 1 |

As shown in FIG. 2, a priority corresponding to the cell 2-1 is 2, and a priority corresponding to the cell 2-2 is 1, indicating that the priority of the cell 2-2 is lower than the priority of the cell 2-1. Therefore, the terminal may preferentially reselect the cell 2-1 based on the first priority information. It may be understood that a larger value of the priority may indicate a higher priority of an identity. This is not limited in this application.

Similarly, in consideration of that the cell 2-1 may be not suitable for accessing, the terminal may first determine whether the cell 2-1 is suitable for accessing after selecting the cell 2-1 having the highest priority. If the cell 2-1 is not suitable for accessing, the terminal may quit reselecting the cell 2-1, select the cell 2-2 having the highest priority from the one or more cells other than the cell 2-1, and reselect the cell 2-2 after determining that the cell 2-2 is suitable for accessing.

It should be noted that: (1) the terminal may alternatively obtain the first priority information in another manner. For example, the terminal obtains the first priority information by receiving dedicated signaling sent by the access network device.

(2) In the foregoing example, there is only one cell having the highest priority. If there are two or more cells having the highest priority, the terminal may select a cell having the best signal quality from the cells having the highest priority after selecting the cells having the highest priority, and reselect the cell. If the first priority information received by the terminal further includes a redistribution parameter of the one or more cells configured by the access network device for the terminal, the terminal may also determine, based on the signal quality and the redistribution parameter of the one or more cells in the radio network area, a cell satisfying the condition from the cell having the highest priority, and reselect the cell. For a specific implementation, refer to the description in the manner 1. This is not described herein again.

If the terminal cannot select a suitable cell from the cells having the highest priority by using the foregoing methods, the terminal may exclude the cell having the highest priority, select a cell having the highest priority from the remaining cells in the radio network area, and perform cell reselection based on the signal quality (and the redistribution parameter). If the suitable cell is selected, the cell is reselected. If no suitable cell can be selected, the foregoing methods are performed by analogy until a suitable cell is selected.

It may be understood that if no suitable cell can be selected in the cell included in the radio network area, the terminal may perform the cell reselection in the list of adjacent cells other than the radio network area. A specific reselection method is similar to a cell reselection procedure in the LTE, and details are not described herein again. In this way, if the cell in the radio network area cannot be reselected, the terminal may reselect a cell outside the radio network area. In addition, when the terminal reselects the cell outside the radio network area, the cell included in the radio network area may be excluded, thereby effectively improving reselection efficiency.

Manner 3: The terminal receives second priority information sent by the access network device, where the second priority information includes priority information of at least one cell; and the terminal performs the cell reselection based on the information about the radio network area and the second priority information.

For example, the radio network area includes a cell 3-1 and a cell 3-2, and the second priority information includes priority information of the cell 3-1, the cell 3-2, and a cell 3-3. A priority of the cell 3-1 is 2, a priority of the cell 3-2 is 1, and a priority of the cell 3-3 is 1. The terminal obtains the priority of the cell 3-1 and the priority of the cell 3-2 based on the second priority information, to further select a cell 3-1 having the highest priority from the cell 3-1 and the cell 3-2, and reselects the cell 3-1.

Similarly, in consideration of that the cell 3-1 may be not suitable for accessing, the terminal may first determine whether the cell 3-1 is suitable for accessing after selecting the cell 3-1 having the highest priority. If the cell 3-1 is not suitable for accessing, the terminal may quit reselecting the cell 3-1, select a cell 3-2 having the highest priority from the one or more cells other than the cell 3-1, and reselect the cell 3-2 after determining that the cell 3-2 is suitable for accessing.

It should be noted that in the foregoing example, there is only one cell (that is, the cell 3-1) having the highest priority. If there are two or more cells having the highest priority, the terminal may select a cell having the best signal quality from the cells having the highest priority after selecting the cells having the highest priority, and reselect the cell. If the second priority information further includes the redistribution parameter of at least one cell, the terminal may obtain the redistribution parameter of the cell in the radio network area based on the second priority information, to further determine, based on the signal quality and the redistribution parameter of the cell in the radio network area, the cell satisfying the condition, and reselect the cell. For a specific implementation, refer to the description in the manner 2. This is not described herein again.

Manner 4: The terminal receives second priority information sent by the access network device, where the second priority information includes priority information of the at least one cell; and the terminal performs cell reselection based on the first priority information and the second priority information.

Specifically, a cell 4-1 is used as an example, if the first priority information includes a priority of the cell 4-1, and the second priority information also includes the priority of the cell 4-1, the terminal may use a higher priority included in the first priority information and the second priority information as the priority of the cell 4-1. For example, if the priority of the cell 4-1 in the first priority information is 1, and the priority of the cell 4-1 in the second priority information is 2, the terminal may determine that the priority of the cell 4-1 is 2.

For example, the first priority information includes priority information of the cell 4-1 and a cell 4-2, and details are shown in Table 3a. The second priority information includes priority information of the cell 4-1, a cell 4-3, and a cell 4-4, and details are shown in Table 3b.

TABLE 3a

Schematic content of first priority information

| Cell identity | First priority information |
| --- | --- |
| Cell 4-1 | 1 |
| Cell 4-2 | 1 |

TABLE 3b

Schematic contents of second priority information

| Cell identity | Second priority information |
| --- | --- |
| Cell 4-1 | 2 |
| Cell 4-3 | 1 |
| Cell 4-4 | 1 |

The terminal obtains, based on the first priority information and the second priority information, that the priority of the cell 4-1 is 2 and the priority of the cell 4-2 is 1. Because the cell 4-3 and the cell 4-4 are not cells included in the radio network area, the terminal selects, based on the priority of the cell 4-1 and the priority of the cell 4-2, a cell 4-1 having the highest priority, and reselects the cell 4-1.

It should be noted that in the foregoing example, there is only one cell (that is, the cell 4-1) having the highest priority. If there are two or more cells having the highest priority, the terminal may select a cell having the best signal quality from the cells having the highest priority after selecting the cells having the highest priority, and reselect the cell.

If the first priority information further includes a redistribution parameter of the one or more cells configured by the access network device for the terminal, and the second priority information further includes the redistribution parameter of the at least one cell, the terminal may further obtain the redistribution parameter of the cell in the radio network area based on the first priority information and the second priority information. It should be noted that if the priority in the first priority information is used as a priority of a cell in the radio network area, the redistribution parameter in the first priority information should also be used as the redistribution parameter of the cell; or if the priority in the second priority information is used as a priority of a cell in the radio network area, the redistribution parameter in the second priority information should also be used as the redistribution parameter of the cell. For example, if the terminal obtains, based on the first priority information and the second priority information, that the priority of the cell 4-1 is 2 (in this case, the priority of the cell 4-1 in the second priority information is used), the terminal may further obtain the redistribution parameter of the cell 4-1 based on the second priority information.

In this way, after the redistribution parameter of the cell in the radio network area is determined by using the foregoing methods, cell reselection may be performed based on the signal quality and the redistribution parameter of the cell having the highest priority. For specific manners, refer to the descriptions in the manner 2 and the manner 3.

It can be known from the foregoing contents that, in the solutions of the embodiments of this application, when cell reselection is performed, the manner 1 differs from the manner 2, the manner 3, and the manner 4 in that: in the manner 1, the priority of the cell is not considered, but cells satisfying a requirement are selected based on the signal quality, and a suitable cell is selected based on the signal quality and the redistribution parameter of the cells satisfying the requirement; and in the manner 2, the manner 3, and the manner 4, the priority of the cell is considered, and the suitable cell is further selected based on the priority, the signal quality, and the like.

The manner 2 and the manner 3 differ from the manner 4 in that: in the manner 2, the priority and the redistribution parameter of the cells in the radio network area are configured when the access network device configures the information about the radio network area for the terminal; in the manner 3, the priority and the redistribution parameter of the cells in the radio network area are determined based on the second priority information; and in the manner 4, the priority and the redistribution parameter of the cell in the radio network area is determined based on the first priority information and the second priority information.

It can be learned of based on the cell reselection methods described above that, in this application, when performing cell reselection, the terminal preferentially considers the cells in the radio network area. If signal quality of a cell in the radio network area satisfies a reselection condition, the cell in the radio network area is reselected by the terminal.

During cell reselection, the terminal in the inactive state gives a higher priority to the cell in the radio network area.

It should be noted that the signal quality in the embodiments of this application is a generalized concept, and may be understood as a parameter for measuring a received state of a signal, for example, may include reference signal received power (RSRP), reference signal received quality (RSRQ), and the like.

In the manner 1 to manner 4 in this application, the redistribution parameter of the cell is used as an example, and in this application, a redistribution parameter of frequencies is also applicable. In this application, the manner 1 to manner 4 are applicable to a reselection process performed by the terminal when moving inside the radio network area. If the terminal moves out of the radio network area, the terminal may perform cell reselection by using a method similar to a conventional cell reselection method.

Based on the foregoing embodiments, an embodiment of this application provides a first communications apparatus, where the communications apparatus may be a terminal or a chip inside a terminal, and the communications apparatus is configured to implement corresponding procedures or steps in the method embodiments shown in FIG. 3 to FIG. 4B. The communications apparatus 600 may include a detection module 601 and a processing module 602. Specifically: the detection module 601 is configured to detect that a terminal in an inactive state is in an out-of-service state; and the processing module 602 is configured to determine a target cell of the terminal, where the processing module 602 is specifically configured to: determine the target cell of the terminal entering an idle state if the target cell is not determined within a first length of time, where the terminal enters the idle state after the first length of time expires; or determine the target cell of the terminal within the first length of time.

In a possible design, the communications apparatus further includes a sending module 603.

The sending module 603 is configured to send first indication information to an access network device corresponding to the target cell, where the first indication information is used to indicate that the terminal is in the out-of-service state before accessing the target cell.

In a possible design, the sending module 603 is specifically configured to send a radio resource control RRC connection setup request message to the access network device corresponding to the target cell of the terminal entering the idle state, where the RRC connection setup request message includes the first indication information.

In a possible design, the sending module 603 is specifically configured to send an RRC connection resume request message to the access network device corresponding to the target cell of the terminal having the target cell determined within the first length of time, where the RRC connection resume request message includes the first indication information.

In a possible design, the processing module 602 is further configured to: start a timer, where a length of time of the timer is the first length of time.

It may be understood that for functions of the modules in the communications apparatus 600, refer to implementations of the corresponding method embodiments. Details are not described herein again.

Figure 7:
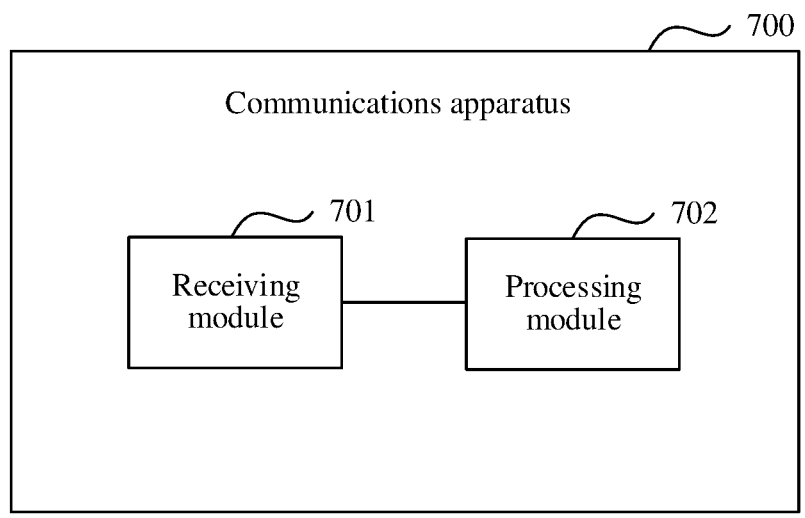
FIG. 7 is a schematic structural diagram of a second communications apparatus according to this application.

An embodiment of this application provides a second communications apparatus, where the communications apparatus may be an access network device or a chip inside an access network device, and the communications apparatus is configured to implement corresponding procedures or steps in the method embodiments shown in FIG. 3 to FIG. 4B. As shown in FIG. 7, the communications apparatus 700 includes a receiving module 701 and a processing module 702. Specifically: the receiving module 701 is configured to receive first indication information, where the first indication information is used to indicate that a terminal is in the out-of-service state before accessing the target cell; and the processing module 702 is configured to determine, according to the first indication information, that the terminal is in the out-of-service state before accessing the target cell.

In a possible design, the receiving module 701 is specifically configured to: receive an RRC connection setup request message from the terminal, where the RRC connection setup request message includes the first indication information.

In a possible design, after determining, according to the first indication information, that the terminal is in the out-of-service state before accessing the target cell, the processing module 702 is further configured to: if determining that context information of the terminal exists, delete the context information of the terminal, and release a network connection that corresponds to the terminal and that is between a core network and an access network.

In a possible design, the receiving module 701 is specifically configured to: receive an RRC connection resume request message from the terminal, where the RRC connection resume request message includes the first indication information.

In a possible design, after determining, according to the first indication information, that the terminal is in the out-of-service state before accessing the target cell, the processing module 702 is further configured to: reserve the inactive state of the terminal if determining that the context information of the terminal exists.

In a possible design, after determining, according to the first indication information, that the terminal is in the out-of-service state before accessing the target cell, the processing module 702 is further configured to: configure the terminal to be in the inactive state, a connected state, or an idle state if determining that the context information of the terminal does not exist.

It may be understood that for functions of the modules in the communications apparatus 700, refer to implementations of the corresponding method embodiments. Details are not described herein again.

Figure 8:
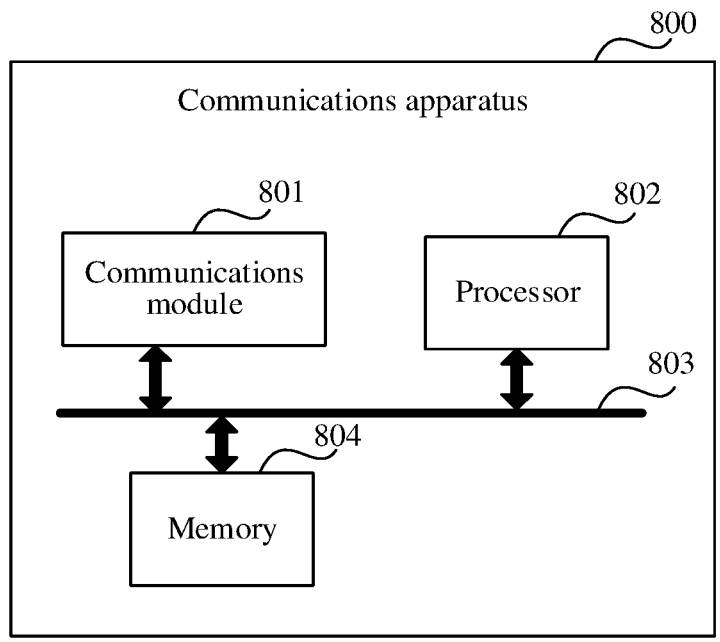
FIG. 8 is a schematic structural diagram of a third communications apparatus according to this application.

An embodiment of this application further provides a third communications apparatus, where the communications apparatus may be a terminal or a chip inside a terminal, and the communications apparatus is configured to implement corresponding procedures or steps in the method embodiments shown in FIG. 3 to FIG. 4B. The communications apparatus has the functions of the communications apparatus 600 shown in FIG. 6. As shown in FIG. 8, the communications apparatus 800 includes a communications module 801 and a processor 802.

The communications module 801 is configured to perform communication interaction with another device, where the communications module 801 may be an RF circuit, a WiFi module, a communications interface, a Bluetooth module, and the like.

Figure 6:
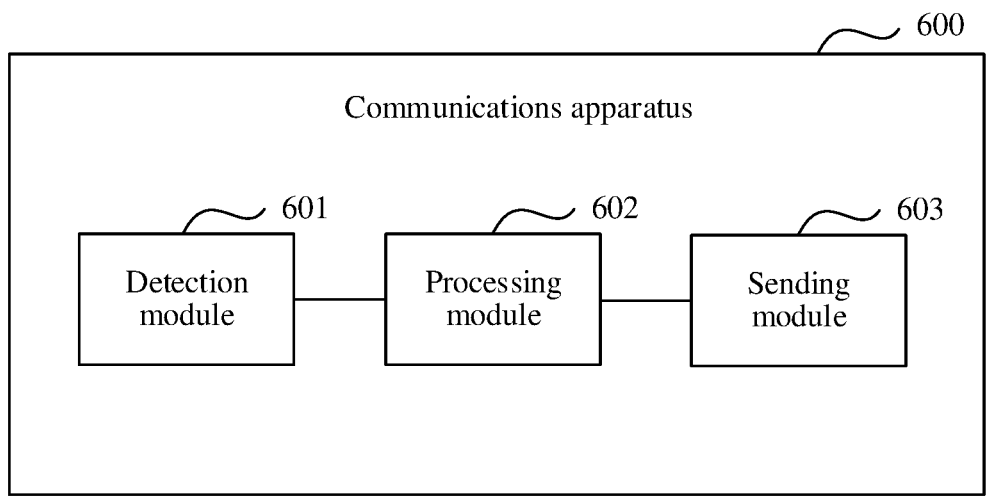
FIG. 6 is a schematic structural diagram of a first communications apparatus according to this application.

The processor 802 is configured to implement functions of the processing module 602 in FIG. 6, for example, including: detecting that a terminal in an inactive state is in an out-of-service state; and determining a target cell of the terminal, where the determining a target cell of the terminal includes: determining the target cell of the terminal entering an idle state if the target cell is not determined within a first length of time, where the terminal enters the idle state after the first length of time expires; or the determining a target cell of the terminal includes determining the target cell of the terminal within the first length of time.

Optionally, the communications apparatus 800 may further include a memory 804, configured to store a program and the like. Specifically, the program may include program code, where the program code includes an instruction. The memory 804 may include an RAM and may further include a nonvolatile memory such as at least one magnetic disk storage. The processor 802 executes an application program stored in the memory 804, to implement the foregoing functions.

In a possible manner, the communications module 8o*i*, the processor 802, and the memory 804 may be connected to each other through the bus 803. The bus 803 may be a peripheral component interconnect standard (PCI) bus, an extended industry standard architecture (EISA) bus, or the like. The bus may be classified into an address bus, a data bus, a control bus, and the like. For ease of representation, only one thick line is used to represent the bus in FIG. 8, but this does not mean that there is only one bus or only one type of bus.

Figure 9:
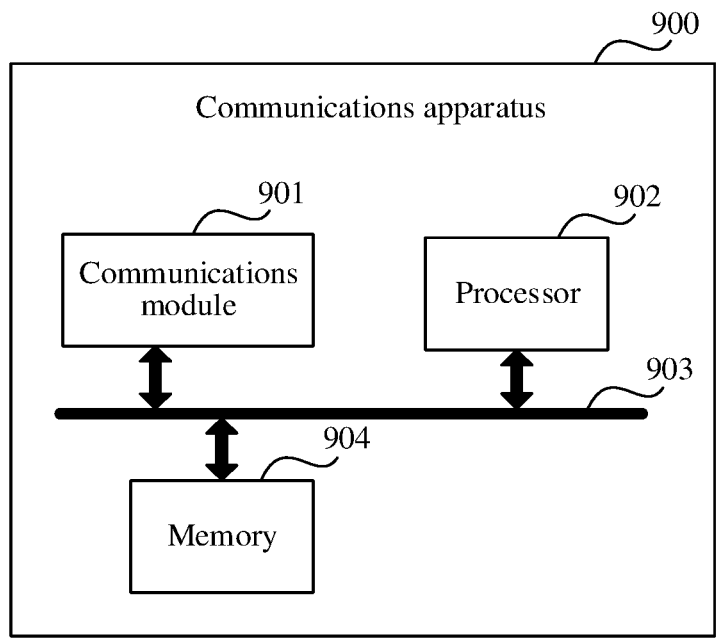
FIG. 9 is a schematic structural diagram of a fourth communications apparatus according to this application.

An embodiment of this application provides a fourth communications apparatus, where the communications apparatus may be an access network device or a chip inside an access network device, and the communications apparatus is configured to implement corresponding procedures or steps in the method embodiments shown in FIG. 3 to FIG. 4B. The communications apparatus has the functions of the communications apparatus 700 shown in FIG. 7. As shown in FIG. 9, the communications apparatus 900 includes a communications module 901 and a processor 902.

The communications module 901 is configured to perform communication interaction with another device, and specifically, configured to receive first indication information, where the first indication information is used to indicate that the terminal is in the out-of-service state before accessing the target cell, where the communications module 901 may be an RF circuit, a WiFi module, a communications interface, a Bluetooth module, and the like.

The processor 902 is configured to implement functions of the processing module 702 in FIG. 7, including: determining, according to the first indication information, that the terminal is in the out-of-service state before accessing the target cell.

Optionally, the communications apparatus 900 may further include a memory 904, configured to store a program and the like. Specifically, the program may include program code, where the program code includes an instruction. The memory 904 may include an RAM and may further include a nonvolatile memory such as at least one magnetic disk storage. The processor 902 executes an application program stored in the memory 904, to implement the foregoing functions.

In a possible manner, the communications module 901, the processor 902, and the memory 904 may be connected to each other through a bus 903. The bus 903 may be a peripheral component interconnect standard (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

Figure 10:
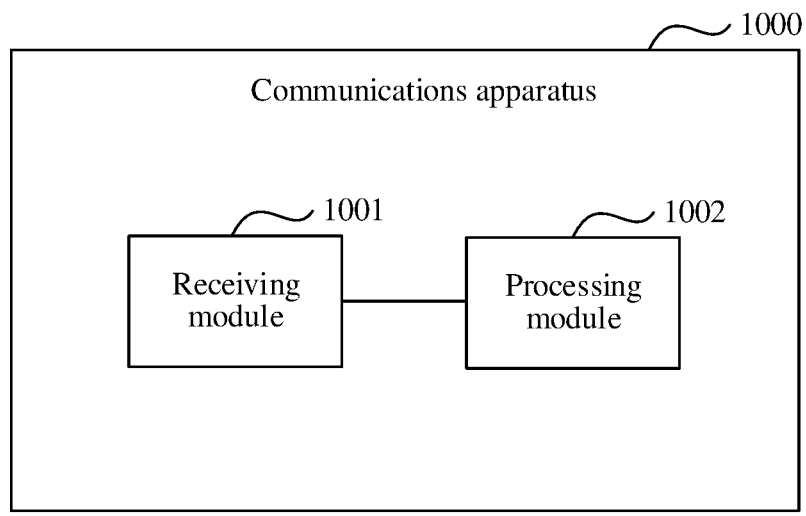
FIG. 10 is a schematic structural diagram of a fifth communications apparatus according to this application.

Based on the foregoing embodiments, this application provides a fifth communications apparatus, where the communications apparatus may be a terminal or a chip inside a terminal, and the communications apparatus is configured to implement corresponding procedures or steps in the method embodiments shown in FIG. 5. As shown in FIG. 10, a communications apparatus 1000 may include a receiving module 1001 and a processing module 1002. Specifically: the receiving module 1001 is configured to receive information about a radio network area configured by an access network device for a terminal, where the radio network area includes one or more cells, and the information about the radio network area includes information used to identify the one or more cells.

The processing module 1002 is configured to perform cell reselection based on the information about the radio network area.

In a possible design, the processing module 1002 is specifically configured to: perform the cell reselection based on signal quality of one or more cells in the radio network area.

In a possible design, the information about the radio network area further includes first priority information, where the first priority information includes priority information of one or more cells included in the radio network area.

The processing module 1002 is specifically configured to: perform the cell reselection based on the first priority information.

In a possible design, the receiving module 1001 is further configured to: receive second priority information, where the second priority information includes priority information of at least one cell.

The processing module 1002 is specifically configured to: perform the cell reselection according to the information about the radio network area and the second priority information.

Optionally, the receiving module 1001 is further configured to: receive second priority information, where the second priority information includes priority information of the at least one cell.

The processing module 1002 is specifically configured to: perform the cell reselection based on the first priority information and the second priority information.

It may be understood that for functions of the modules in the communications apparatus 1000, refer to implementations of the corresponding method embodiments. Details are not described herein again.

Figure 11:
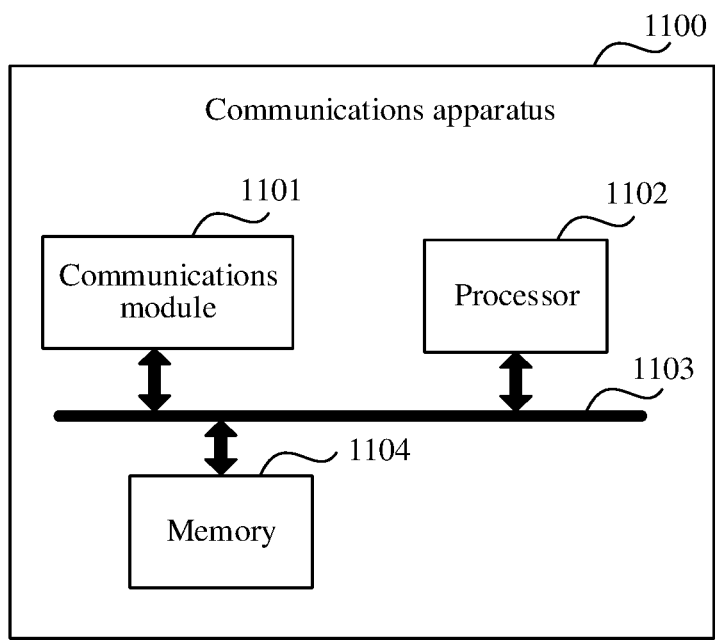
FIG. 11 is a schematic structural diagram of a sixth communications apparatus according to this application.

An embodiment of this application further provides a sixth communications apparatus, where the communications apparatus may be a terminal or a chip inside a terminal, and the communications apparatus is configured to implement corresponding procedures or steps in the method embodiment shown in FIG. 5. The communications apparatus has the function of the communications apparatus 1000 shown in FIG. 10. As shown in FIG. 11, the communications apparatus 1100 includes a communications module 1101 and a processor 1102.

The communications module 1101 is configured to perform communication interaction with another device, and specifically, configured to receive information about a radio network area configured by an access network device for a terminal, where the radio network area includes one or more cells, and the information about the radio network area includes information used to identify the one or more cells, and where the communications module 1101 may be an RF circuit, a WiFi module, a communications interface, a Bluetooth module, and the like; and The processor 1102 is configured to implement functions of the processing module 1002 in FIG. 10, for example, including: performing cell reselection based on the information about the radio network area.

Optionally, the communications apparatus 1101 may further include a memory 1104, configured to store a program and the like. Specifically, the program may include program code, where the program code includes an instruction. The memory 1104 may include an RAM and may further include a nonvolatile memory such as at least one magnetic disk storage. The processor 1102 executes an application program stored in the memory 1104, to implement the foregoing functions.

In a possible manner, the communications module 1101, the processor 1102, and the memory 1104 may be connected to each other through the bus 1103. The bus 1103 may be a peripheral component interconnect standard (PCI) bus, an extended industry standard architecture (EISA) bus, or the like. The bus may be classified into an address bus, a data bus, a control bus, and the like. For ease of representation, only one thick line is used to represent the bus in FIG. 11, but this does not mean that there is only one bus or only one type of bus.

Figure 12:
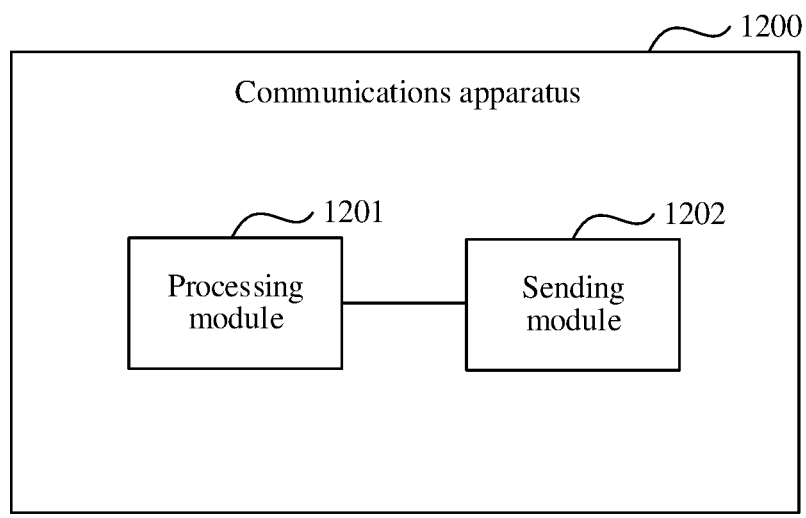
FIG. 12 is a schematic structural diagram of a seventh communications apparatus according to this application.

Based on the foregoing embodiments, this application provides a seventh communications apparatus, where the communications apparatus may be an access network device or a chip inside an access network device, and the communications apparatus is configured to implement corresponding procedures or steps in the method embodiments shown in FIG. 2a and FIG. 2b. As shown in FIG. 12, a communications apparatus 1200 may include a processing module 1201 and a sending module 1202. Specifically: the processing module 1201 is configured to page a terminal in a radio network area based on information about the radio network area of the terminal, where the radio network area includes one or more cells, and the information about the radio network area includes information used to identify the one or more cells.

If determining that the paging fails, the sending module 1202 sends the information about the radio network area of the terminal to a core network device.

In a possible design, the processing module 1201 is further configured to: delete context information of the terminal, where the context information of the terminal includes the information about the radio network area.

In this way, if it is determined that the paging fails, it indicates that the information about the radio network area of the terminal may have been invalid. In this case, the context information of the terminal is deleted, so that storage resources can be effectively saved.

In a possible design, the processing module 1201 is further configured to: release a network connection that corresponds to the terminal and that is between an access network and a core network.

In this way, if it is determined that the paging fails, it indicates that the network connection that corresponds to the terminal and that is between the access network and the core network may have been unavailable. In this case, the network connection that corresponds to the terminal and that is between the access network and the core network is deleted, so that network resources can be effectively saved.

Figure 13:
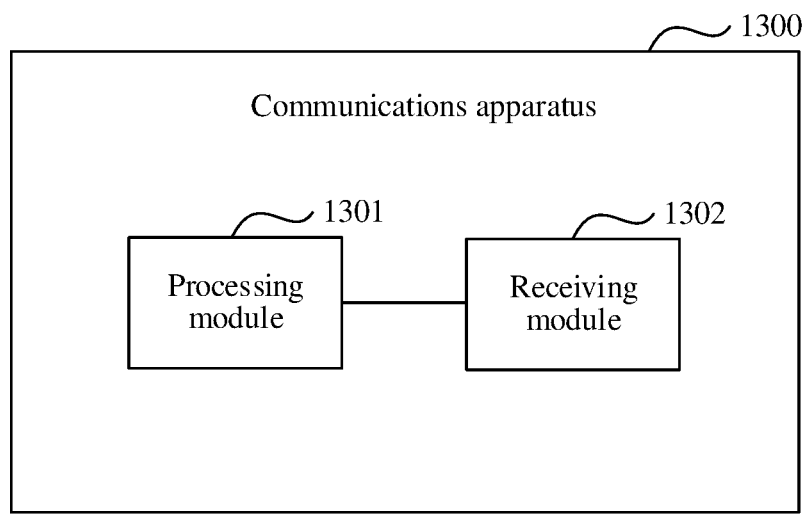
FIG. 13 is a schematic structural diagram of an eighth communications apparatus according to this application.

This application provides an eighth communications apparatus, where the communications apparatus may be a core network device or a chip inside a core network device, and the communications apparatus is configured to implement corresponding procedures or steps in the method embodiments shown in FIG. 2a and FIG. 2b. As shown in FIG. 13, a communications apparatus 1300 may include a processing module 1301 and a receiving module 1302. Specifically: the receiving module 1302 is configured to receive information about a radio network area of a terminal sent by an access network device, where the radio network area includes one or more cells, and the information about the radio network area includes information used to identify the one or more cells; and the processing module 1301 is configured to page, based on the information about the radio network area, the terminal in an area indicated by tracking area TA information other than the radio network area, where the area indicated by the TA information of the terminal may specifically be an area indicated by one or more pieces of TA information of the terminal.

In this way, after the core network device receives the information about the radio network area of the terminal, a radio network area in which the paging by the access network device has failed may be excluded. To be specific, the terminal is paged in the area indicated by the TA information of the terminal other than the radio network area, thereby reducing waste of signaling resources and improving paging efficiency.

In a possible design, the processing module 1301 is further configured to: release a network connection that corresponds to the terminal and that is between an access network and a core network.

Figure 14:
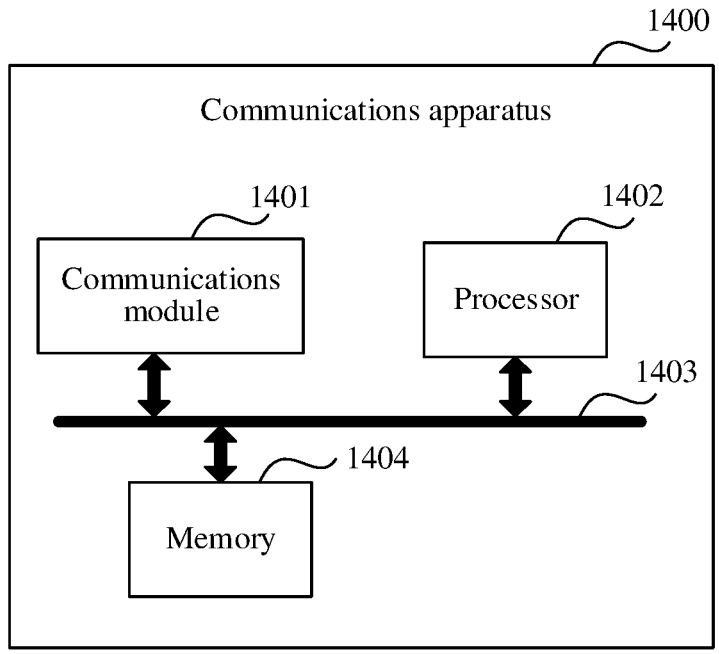
FIG. 14 is a schematic structural diagram of a ninth communications apparatus according to this application.

An embodiment of this application further provides a ninth communications apparatus, where the communications apparatus may be an access network device or a chip inside an access network device, and the communications apparatus is configured to implement corresponding procedures or steps in the method embodiments shown in FIG. 2a and FIG. 2b. The communications apparatus has the functions of the communications apparatus 1200 shown in FIG. 12. As shown in FIG. 14, the communications apparatus 1400 includes a communications module 401 and a processor 1402.

The communications module 401 is configured to perform communication interaction with another device, where the communications module 401 may be an RF circuit, a WiFi module, a communications interface, a Bluetooth module, and the like.

The processor 1402 is configured to implement functions of the processing module 1201 in FIG. 12, for example, including: paging a terminal in a radio network area based on information about the radio network area of the terminal, where the radio network area includes one or more cells, and the information about the radio network area includes information used to identify the one or more cells; and sending the information about the radio network area of the terminal to a core network device if determining that the paging fails.

Optionally, the communications apparatus 1400 may further include a memory 1404, configured to store a program and the like. Specifically, the program may include program code, where the program code includes an instruction. The memory 1404 may include an RAM and may further include a nonvolatile memory such as at least one magnetic disk storage. The processor 1402 executes an application program stored in the memory 1404, to implement the foregoing functions.

In a possible manner, the communications module 401, the processor 1402, and the memory 1404 may be connected to each other through the bus 1403. The bus 1403 may be a peripheral component interconnect standard (PCI) bus, an extended industry standard architecture (EISA) bus, or the like. The bus may be classified into an address bus, a data bus, a control bus, and the like. For ease of representation, only one thick line is used to represent the bus in FIG. 14, but this does not mean that there is only one bus or only one type of bus.

Figure 15:
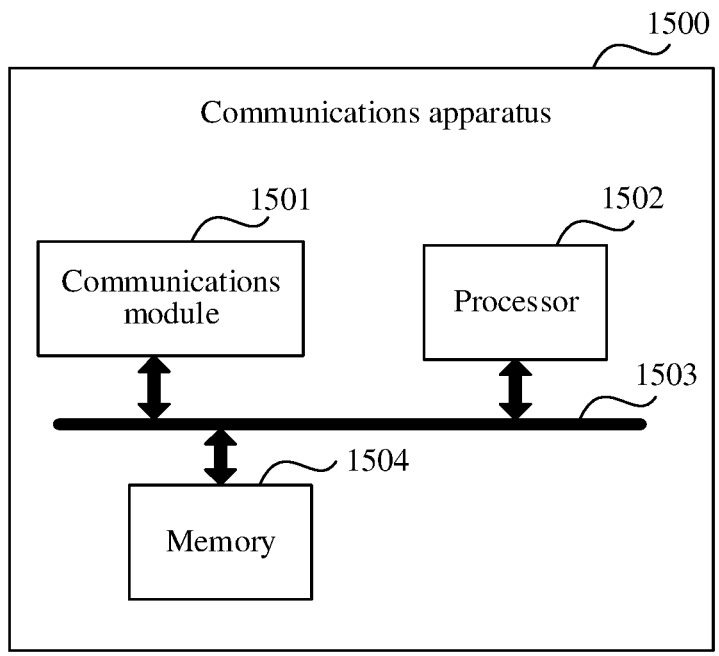
FIG. 15 is a schematic structural diagram of a tenth communications apparatus according to this application.

An embodiment of this application provides a tenth communications apparatus, where the communications apparatus may be a core network device or a chip inside a core network device, and the communications apparatus is configured to implement corresponding procedures or steps in the method embodiments shown in FIG. 2a to FIG. 2b. The communications apparatus has the function of the communications apparatus 1300 shown in FIG. 13. As shown in FIG. 15, the communications apparatus 1500 includes a communications module 1501 and a processor 1502, where the communications module 1501 is configured to perform communication interaction with another device, and specifically, configured to receive information about a radio network area of a terminal sent by an access network device, where the radio network area includes one or more cells, and the information about the radio network area includes information used to identify the one or more cells, and where the communications module 1501 may be an RF circuit, a WiFi module, a communications interface, a Bluetooth module, and the like.

The processor 1502 is configured to implement functions of the processing module 1301 in FIG. 13, including: paging, based on the information about the radio network area, the terminal in an area indicated by tracking area TA information other than the radio network area, where the area indicated by the TA information of the terminal may specifically be an area indicated by one or more pieces of TA information of the terminal.

Optionally, the communications apparatus 1500 may further include a memory 1504, configured to store a program and the like. Specifically, the program may include program code, where the program code includes an instruction. The memory 1504 may include an RAM and may further include a nonvolatile memory such as at least one magnetic disk storage. The processor 1502 executes an application program stored in the memory 1504, to implement the foregoing functions.

It should be noted that, in this embodiment of this application, module division is exemplary, and is merely a logical function division. In actual implementation, another division manner may exist. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of the software functional module and sold or used as an independent product, the integrated module may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by means of software, hardware, firmware, or any combination thereof. When the software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The embodiments of the present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to the embodiments of the present invention without departing from the spirit and scope of this application. This application is intended to cover these modifications and variations provided that the modifications and variations of the embodiments of this application fall within the scope defined by the following claims and their equivalent technologies in this application.

What is claimed is:

1. A method applied in a terminal, the method comprising:
   detecting that the terminal in an inactive state fails to find a suitable cell, wherein the inactive state is a radio resource control (RRC) state different from a connected state or an idle state;
   performing entering the idle state from the inactive state;
   accessing a cell which belongs to an access network device; and
   sending first indication information to the access network device, wherein the first indication information indicates that the terminal fails to find the suitable cell in the inactive state.

2. The method according to claim 1, wherein the first indication information comprises at least one of the following:
   duration information of failing to find the suitable cell in the inactive state, start time information of failing to find the suitable cell in the inactive state, location information of the terminal while failing to find the suitable cell in the inactive state, or time information of the terminal while failing to find the suitable cell in the inactive state.

3. The method according to claim 1, wherein sending the first indication information to the access network device comprises:
   sending an RRC connection setup request message to the access network device, wherein the RRC connection setup request message comprises the first indication information.

4. The method according to claim 1, further comprising:
   starting a timer, wherein a length of time of the timer is a first length of time; and
   determining the cell within the first length of time.

5. The method according to claim 1, wherein detecting that the terminal in the inactive state fails to find the suitable cell comprises:
   detecting that the terminal is in the inactive state and fails to find the suitable cell in a specified time.

6. A method applied in a radio access network device, the method comprising:
   receiving first indication information, wherein the first indication information indicates that a terminal fails to find a suitable cell in an inactive state before accessing a cell of the radio access network device, and the inactive state is a radio resource control (RRC) state different from a connected state or an idle state; and
   determining, according to the first indication information, that the terminal fails to find the suitable cell in the inactive state before accessing the cell.

7. The method according to claim 6, wherein receiving the first indication information comprises:
   receiving an RRC connection setup request message from the terminal, wherein the RRC connection setup request message comprises the first indication information.

8. The method according to claim 6, wherein after determining, according to the first indication information, that the terminal fails to find the suitable cell in the inactive state before accessing the cell, the method further comprises:
   in response to determining that context information of the terminal exists in the radio access network device, deleting the context information of the terminal, and releasing a network connection that corresponds to the terminal and that is between a core network and an access network.

9. The method according to claim 6, wherein after determining, according to the first indication information, that the terminal fails to find the suitable cell in the inactive state before accessing the cell, the method further comprises:
   configuring the terminal to be in the inactive state, the connected state, or the idle state in response to determining that context information of the terminal does not exist in the radio access network device when the first indication information is received.

10. The method according to claim 6, wherein the terminal fails to find the suitable cell when the terminal is in the inactive state in a specified time.

11. The method according to claim 6, wherein the first indication information comprises at least one of the following:
    duration information of failing to find the suitable cell in the inactive state, start time information of failing to find the suitable cell in the inactive state, location information of the terminal while failing to find the suitable cell in the inactive state, or time information of the terminal while failing to find the suitable cell in the inactive state.

12. An apparatus, comprising:
    a non-transitory memory storing computer instructions for execution by at least one processor; and
    the at least one processor configured to retrieve and execute the computer instructions, wherein the computer instructions, when executed by the at least one processor, cause the apparatus to:
    detect that a terminal in an inactive state fails to find a suitable cell, wherein the inactive state is a radio resource control (RRC) state different from a connected state or an idle state;
    enter to the idle state from the inactive state;
    access a cell which belongs to an access network device; and
    send first indication information to the access network device, wherein the first indication information indicates that the terminal fails to find the suitable cell in the inactive state.

13. The apparatus according to claim 12, wherein the first indication information comprises at least one of the following:
    duration information of failing to find the suitable cell in the inactive state, start time information of failing to find the suitable cell in the inactive state, location information of the terminal while failing to find the suitable cell in the inactive state, or time information of the terminal while failing to find the suitable cell in the inactive state.

14. The apparatus according to claim 12, wherein the computer instructions, when executed by the at least one processor, further cause the apparatus to:
   send an RRC connection setup request message to the access network device corresponding to the cell of the terminal entering the idle state, wherein the RRC connection setup request message comprises the first indication information.

15. The apparatus according to claim 12, wherein detecting that the terminal in the inactive fails to find the suitable cell comprises:
   detecting that the terminal is in the inactive state and fails to find the suitable cell in a specified time.

16. A radio access network device, comprising:
   a non-transitory memory storing computer instructions for execution by at least one processor; and
   the at least one processor configured to retrieve and execute the computer instructions, wherein, when executed by the at least one processor, the computer instructions cause the radio access network device to:
   receive first indication information, wherein the first indication information indicates that a terminal fails to find a suitable cell in an inactive state before accessing a cell of the radio access network device, and the inactive state is a radio resource control (RRC) state different from a connected state or an idle state; and
   determine, according to the first indication information, that the terminal fails to find the suitable cell in the inactive state before accessing the cell.

17. The radio access network device according to claim 16, wherein the first indication information comprises at least one of the following:
   duration information of failing to find the suitable cell in the inactive state, start time information of failing to find the suitable cell in the inactive state, location information of the terminal while failing to find the suitable cell in the inactive state, or time information of the terminal while failing to find the suitable cell in the inactive state.

18. The radio access network device according to claim 16, wherein, when executed by the at least one processor, the computer instructions further cause the radio access network device to:
   in response to determining that context information of the terminal exists in the radio access network device, delete context information of the terminal, and release a network connection that corresponds to the terminal and that is between a core network and an access network.

19. The network device according to claim 16, wherein the terminal fails to find the suitable cell when the terminal is in the inactive state in a specified time.

* * * * *

UNITED STATES PATENT AND TRADEMARK OFFICE
CERTIFICATE OF CORRECTION

PATENT NO. : 12,200,619 B2
APPLICATION NO. : 17/453261
DATED : January 14, 2025
INVENTOR(S) : Geng et al.

Page 1 of 1

It is certified that error appears in the above-identified patent and that said Letters Patent is hereby corrected as shown below:

In the Claims

In Column 38, in Claim 12, Line 59, delete "device," and insert -- devices, --.

Signed and Sealed this
Eighteenth Day of February, 2025

Coke Morgan Stewart
*Acting Director of the United States Patent and Trademark Office*